United States Patent
Lutz et al.

(10) Patent No.: US 11,865,908 B2
(45) Date of Patent: Jan. 9, 2024

(54) DUAL TRANSMISSION WITH TRIANGULARLY ARRANGED GEAR CENTER POSITIONS

(71) Applicant: HOFER POWERTRAIN INNOVATION GMBH, Nürtingen (DE)

(72) Inventors: Mathias Lutz, Tübingen (DE); Klaus Kalmbach, Mössingen (DE); Markus Lee, Nürtingen (DE); Fabian Kelch, Stuttgart (DE)

(73) Assignee: HOFER POWERTRAIN INNOVATION GMBH, Nürtingen (DE)

( * ) Notice: Subject to any disclaimer, the term of this patent is extended or adjusted under 35 U.S.C. 154(b) by 0 days.

(21) Appl. No.: 17/625,183

(22) PCT Filed: Jul. 9, 2020

(86) PCT No.: PCT/EP2020/069431
§ 371 (c)(1),
(2) Date: Jan. 6, 2022

(87) PCT Pub. No.: WO2021/005175
PCT Pub. Date: Jan. 14, 2021

(65) Prior Publication Data
US 2022/0281303 A1   Sep. 8, 2022

(30) Foreign Application Priority Data

Jul. 9, 2019   (DE) ...................... 20 2019 103 770.9
Jul. 9, 2019   (DE) ...................... 20 2019 103 771.7
(Continued)

(51) Int. Cl.
*B60K 1/02*   (2006.01)
*B60K 17/12*   (2006.01)
(Continued)

(52) U.S. Cl.
CPC ................ *B60K 1/02* (2013.01); *B60K 17/12* (2013.01); *F16H 1/22* (2013.01); *F16H 37/065* (2013.01);
(Continued)

(58) Field of Classification Search
CPC .. B60K 1/02; B60K 17/12; B60K 2007/0061; F16H 1/22; F16H 57/0031; F16H 57/023; F16H 57/027; F16H 37/065
See application file for complete search history.

(56) References Cited

U.S. PATENT DOCUMENTS

| | | |
|---|---|---|
| 2,818,047 A | 12/1957 | Powell |
| 3,529,698 A | 9/1970 | Nelson et al. |

(Continued)

FOREIGN PATENT DOCUMENTS

| | | |
|---|---|---|
| CN | 201800514 U | 4/2011 |
| CN | 104709059 A | 6/2015 |

(Continued)

OTHER PUBLICATIONS

International Search Report for International Application No. PCT/EP2020/069431 filed on July 9, 2020 on behalf of Hofer Powertrain Innovation Gmbh dated Oct. 23, 2020 7 pages (English + Original).

(Continued)

*Primary Examiner* — Tinh Dang
(74) *Attorney, Agent, or Firm* — Steinfl + Bruno LLP

(57) ABSTRACT

A dual transmission with input shafts, output shafts, a transmission case and two separate single transmissions arranged in the transmission case is described. Each single transmission is a two-stage spur gear transmission with three positions for gear centers. A first position is occupied by an input shaft and a second position by an output shaft. A third position is for a middle stationary axle fixed to the transmission case. The three positions define a triangular arrange- (Continued)

ment having a first side defined by a distance between the first position and the second position, a second side defined by a distance between the first position and the third position, and a third side defined by a distance between the second position and the third position. The second side and the third side form respective angles with the first side. At least one of these angles has a value ranging between 5° and 70°.

20 Claims, 9 Drawing Sheets

(30) Foreign Application Priority Data

Jul. 9, 2019 (DE) .................. 20 2019 103 778.4
Jul. 9, 2019 (DE) .................. 20 2019 103 781.4

(51) Int. Cl.
*F16H 37/06* (2006.01)
*F16H 1/22* (2006.01)
*F16H 57/00* (2012.01)
*F16H 57/023* (2012.01)
*F16H 57/027* (2012.01)
*B60K 7/00* (2006.01)

(52) U.S. Cl.
CPC ....... *F16H 57/0031* (2013.01); *F16H 57/023* (2013.01); *F16H 57/027* (2013.01); *B60K 2007/0061* (2013.01)

(56) References Cited

U.S. PATENT DOCUMENTS

| | | | |
|---|---|---|---|
| 4,987,795 A | 1/1991 | Nguyen | |
| 5,293,788 A | 3/1994 | Blom | |
| 7,338,405 B2 | 3/2008 | Nash et al. | |
| 7,690,455 B2 | 4/2010 | Kano et al. | |
| 8,678,118 B2* | 3/2014 | Takenaka | B60K 6/52 |
| | | | 180/65.6 |
| 10,207,572 B2* | 2/2019 | Makino | B60K 7/0007 |
| 2006/0150759 A1 | 7/2006 | Gitt | |
| 2007/0213161 A1 | 9/2007 | Tabata et al. | |
| 2010/0144480 A1 | 6/2010 | Downs et al. | |
| 2010/0187026 A1 | 7/2010 | Knoblauch | |
| 2011/0139522 A1 | 6/2011 | Takenaka et al. | |
| 2013/0316866 A1 | 11/2013 | Kawamura et al. | |
| 2014/0155214 A1 | 6/2014 | Kimura et al. | |
| 2014/0353052 A1 | 12/2014 | Muto et al. | |
| 2015/0060228 A1 | 3/2015 | Francis et al. | |
| 2015/0240935 A1 | 8/2015 | Kampe et al. | |
| 2016/0115963 A1 | 4/2016 | Kempter et al. | |
| 2016/0226289 A1 | 8/2016 | Yu | |
| 2017/0002919 A1 | 1/2017 | Neumann et al. | |
| 2017/0274763 A1 | 9/2017 | Frohnmayer et al. | |
| 2018/0015815 A1* | 1/2018 | Makino | F16H 57/043 |
| 2018/0141423 A1 | 5/2018 | Makino et al. | |
| 2018/0328480 A1 | 11/2018 | Nakano et al. | |
| 2019/0337383 A1 | 11/2019 | Zhu et al. | |
| 2022/0260153 A1 | 8/2022 | Lutz et al. | |

FOREIGN PATENT DOCUMENTS

| | | |
|---|---|---|
| CN | 105179650 A | 12/2015 |
| CN | 205101518 U | 3/2016 |
| DE | 143174 A1 | 8/1980 |
| DE | 3819519 A1 | 12/1989 |
| DE | 4136392 A1 | 5/1992 |
| DE | 4209980 A1 | 9/1993 |
| DE | 102005056909 A1 | 5/2007 |
| DE | 112005002356 T5 | 8/2007 |
| DE | 102006043723 A1 | 3/2008 |
| DE | 10054759 B4 | 10/2009 |
| DE | 102009018786 A1 | 10/2009 |
| DE | 102009057458 A1 | 7/2010 |
| DE | 102009006523 A1 | 8/2010 |
| DE | 102011115785 A1 | 4/2013 |
| DE | 112012000684 T5 | 11/2013 |
| DE | 102013208564 A1 | 11/2014 |
| DE | 102014216753 A1 | 3/2015 |
| DE | 102015202711 A1 | 8/2015 |
| DE | 102015105243 A1 | 10/2015 |
| EP | 2332760 A1 | 6/2011 |
| EP | 2310220 B1 | 7/2012 |
| EP | 3284972 A1 | 2/2018 |
| FR | 2881804 A1 | 8/2006 |
| JP | S60215159 A | 10/1985 |
| JP | H0532863 U | 4/1993 |
| JP | H05116542 A | 5/1993 |
| JP | 2005083491 A | 3/2005 |
| JP | 2007032797 A | 2/2007 |
| JP | 2009030743 A | 2/2009 |
| JP | 2009180281 A | 8/2009 |
| JP | 2014015976 A | 1/2014 |
| JP | 2014015977 A | 1/2014 |
| JP | 2016175563 A | 10/2016 |
| JP | 2016205444 A | 12/2016 |
| JP | 2017019319 A | 1/2017 |
| JP | 2017129178 A | 7/2017 |
| JP | 2017129205 A | 7/2017 |
| JP | 2018039396 A | 3/2018 |
| WO | 2005/008098 A1 | 1/2005 |
| WO | 2010/021413 A2 | 2/2010 |
| WO | 2016/147865 A1 | 9/2016 |
| WO | 2016/152454 A1 | 9/2016 |
| WO | 2017/063595 A1 | 4/2017 |
| WO | 2017/138312 A1 | 8/2017 |
| WO | 2018/121420 A1 | 7/2018 |
| WO | 2021/005175 A1 | 1/2021 |
| WO | 2021/005186 A1 | 1/2021 |

OTHER PUBLICATIONS

International Search Report for International Application No. PCT/EP2020/069463 filed on July 9, 2020 on behalf of Hofer Powertrain Innovation Gmbh dated Sep. 1, 2020 7 pages (English + Original).
Written Opinion for International Application No. PCT/EP2020/069431 filed on Jul. 9, 2020 on behalf of Hofer Powertrain Innovation Gmbh dated Oct. 23, 2020 19 pages (English + Original).
Written Opinion for International Application No. PCT/EP2020/069463 filed on Jul. 9, 2020 on behalf of Hofer Powertrain Innovation Gmbh dated Sep. 1, 2020 16 pages (English + Original).
Non-Final Office Action for U.S. Appl. No. 17/625,310, filed Jan. 6, 2022 on behalf of Hofer Powertrain Innovation Gmbh, dated Sep. 14, 2023 (19 pages).

* cited by examiner

DUAL TRANSMISSION WITH TRIANGULARLY ARRANGED GEAR CENTER POSITIONS

CROSS REFERENCE TO RELATED APPLICATIONS

The present application is the U.S. National Stage of International Patent Application No. PCT/EP2020/069431 filed on Jul. 9, 2020 which, in turn, claims priority to German Patent Application No. 20 2019 103 770.9 filed on Jul. 9, 2019, German Patent Application No. 20 2019 103 771.7 filed on Jul. 9, 2019, German Patent Application No. 20 2019 103 778.4 filed on Jul. 9, 2019, and German Application No. 20 2019 103 781.4 filed on Jul. 9, 2019.

The present invention relates to a dual transmission (dual gearbox) or twin transmission (twin gearbox) as part of an electric powertrain for a vehicle equipped with two electric machines, each of which is designed to drive one wheel, in accordance with a speed reduction, by means of a separate single transmission in the dual transmission. Such powertrains are sometimes also referred to as a tandem motor powertrain. Here, a single transmission is advantageously a two-stage spur gear transmission with three positions for gear centers in a transmission case.

The present invention additionally discloses a possibility for transmitting power and torque in a transmission that is part of an electric powertrain. The transmission has at least one input shaft and one output shaft, the output shaft being designed for connection of a wheel half-axle, such as a universal shaft.

In other words, the present invention relates to a dual transmission according to the preamble of claim 1.

The invention also relates to a method according to the preamble of claim 15 for transmitting power and/or torque by means of a transmission.

TECHNICAL FIELD

Electrically powered vehicles can be designed in such a way that at least two wheels, for example the two wheels of a rear axle, are driven by a dedicated electric motor. The electric motor often rotates at high speed in comparison to the desired wheel speed (for example at up to 15,000 rpm, in higher-speed designs at up to 18,000 rpm or even at up to 20,000 rpm). For this reason, the speed of the electric motor must be reduced (for example by a ratio i between 6 and 9, possibly even by a ratio i in a ratio range of 4 to 12). The first electric motor acts on an input gear of a first step-down gearing. The second electric motor acts on a different, second input gear of a second, different step-down gearing. The transmission to driven shafts, which at the same time may be the wheel half-axles of the motor vehicle, takes place via one or more stages. If the two transmissions are installed in one complete transmission case, the electric motors may be flanged onto the side of the transmission case, i.e. the first electric motor onto a first side and the second electric motor onto another side.

Powertrains designed in such a way are presented both in the drawings of JP 2016 205 444 A (publication date: 8 Dec. 2016; applicant: NTN TOYO BEARING CO LTD) and in the drawings of JP 2017 019 319 A (publication date: 26 Jan. 2017; applicant: NTN TOYO BEARING CO LTD).

Such transmissions can be referred to as dual transmissions or also as twin transmissions because ultimately two completely independent transmissions are joined to form a larger transmission unit. Owing to the two electric machines that are present, which are usually of identical type, the expression "duo electric machine" can also be used.

Any actuations, particularly with regard to speed and torque, of the connected wheels can be carried out with the aid of motor controls. Such a powertrain is commonly referred to as electric "torque-vectoring". This enables a continuously variable control of the respective wheel torque on the driven wheels of the motor vehicle, particularly when cornering, as a result of which the driving stability of the motor vehicle can be improved and the steering effort can be reduced. This category of transmission can also be referred to as an active differential. These transmissions also increase the efficiency of a powertrain of a motor vehicle. In the case of motor vehicles that have just one driving traction motor at a time, transmissions of the cross-drive type are required for this. Based on the mode of operation, therefore, the transmissions can also be referred to as multiple single-wheel transmissions.

The twin transmission is designed to drive two road wheels independently. Through the rotation of the output shafts of the transmission, a direction of travel of the vehicle, which advantageously has a passenger compartment, for example a car or a truck such as a small truck or van, can be specified by controlling the rotation of the at least two wheels.

PRIOR ART

The intellectual property rights literature contains a few publications which deal with the type of transmission described above or with similar or comparable types of transmissions.

For instance, WO 2016/147 865 A1 (applicant: NTN TOYO BEARING CO. LTD; laid-open date: 22 Sep. 2016) shows in numerous figures a possible powertrain comprising two electric machines and two half-axles, so that in the presented powertrain each electric machine is intended to drive one half-axle. Relative relationships and/or arrangements of axles of individual gears of the transmission can be seen in some figures. A powertrain as shown in WO 2016/147 865 A1 has therefore been designed, the highest axle of which is said to be the driveshaft axle, while an axle interposed between the drive gear and the driven gear occupies a middle position. The motors are said to be placed in front of the rear axle.

EP 2 310 220 B1 (applicants: AISIN AW CO. LTD, TOYOTA JIDOSHA KABUSHI KAISHA; laid-open date: 20 Apr. 2011) shows possible shaft or axle positions of a three-stage dual transmission in a transmission case. Arranged in one (single) transmission case are two electric motors, each of which can be used to drive an input shaft of a sub-transmission. Two central axles, a so-called idler shaft and a countershaft, are said to be arranged in parallel and offset from each other between the input shafts and the output shafts. This is said to slow down the speeds that are to be respectively transmitted to one of the two output shafts. EP 2 310 220 B1 therefore wishes to provide the entire drive unit with a single complete case around this drive unit. The electric motors are also part of the transmission. Such designs should work for system suppliers who want to design their entire drive unit as a replaceable and possibly also disposable product.

In general terms, DE 100 54 759 B4 (patent proprietor: ZF Friedrichshafen AG; date of grant: 29 Oct. 2009) and WO 2005/008 098 A1 (applicant: DaimlerChrysler AG; publication date: 27 Jan. 2005) recommend providing, as bearings, two or three tapered roller bearings between two shafts that are combined to form a dual shaft of a dual-clutch transmission because this type of bearing is said to be able to absorb radial forces and axial forces in a particularly compact manner. In the case of dual-clutch transmissions, it is customary to switch two or more than two drive sources on the input side alternately to one of the two input shafts of the transmission. In other words, torque is usually transmitted via one of the two input shafts of the transmission, which are combined to form a coaxial shaft, while the second shaft is not intended to transmit any drive power in that phase. One shaft is loaded, whereas the other shaft is usually without load for as long a duration as possible while there is a load on said one shaft. Depending on the overlay function, a loading of both shafts occurs only during load changes, with the torque flowing in the same direction through both shafts.

Patent application US 2018/0 015 815 A1 (applicant: NTN Corporation; publication date: 18 Jan. 2018) deals with a twin drive, in which the input shaft and the output shaft are guided coaxially as a dual shaft for each drive side. In this connection, said US patent application also mentions, inter alia, a lubrication of bearings as well as lubrication possibilities for the driving electric machine, in each case via channels. The effect of a centrifugal force is used for the lubrication. However, the document also shows examples for transmissions in which all four shafts, i.e. the input shafts and the output shafts, are arranged separately from each other.

JP 2018-039 396 A (applicant: NTN CORP; publication date: 15 Mar. 2018) deals with a motor vehicle drive comprising two motors, which is similar to the drive according to US 2018/0 015 815 A1. In such a drive, a seal is said to be located between the oil-filled transmission and each of the electric motors. JP 2018-039 396 A also describes some aspects of its overall lubrication system.

JP H051-16 542 A (applicant: AISIN AW CO. LTD; publication date: 14 May 1993) describes a system comprising multiple motors, wherein the heat capacity of each motor is said to be increased. The cooling can take place by means of oil, for example, which is said to flow in channels through the motor windings and to be circulated by a pump.

U.S. Pat. No. 2,818,047 A (proprietor: Continental Motors Corporation; publication date: 31 Dec. 1957) deals with a breather system which is installed in a crankshaft of an internal combustion engine. In bores of the crankshaft, heavier particles are to be separated from the oil mist in the interior of the combustion engine by using the centrifugal force and are to be returned to the crankcase.

DE 10 2009 018 786 A1 (applicant: MAGNA Powertrain AG & Co KG; laid-open date: 29 Oct. 2009) presents a so-called fluid ring in a fluid or oil lubrication of a transmission. In the case of a rotatably mounted shaft, the lubrication is said to take place by entrained fluid or oil. FIG. 2 of DE 10 2009 018 786 A1 shows a vent channel, via which reputedly as far as possible no oil escapes, even in the event of a rise in pressure. The fluid ring is said to perform the function of a shielding ring, which is able to catch any fluid ejected directly in the direction of the vent channel. To create the gas permeability, at least one side wall of the fluid ring can be provided with at least one aperture. A kind of "labyrinth" is thus said to be created, in order to decelerate the fluid so that it can then flow off into an annular groove of the fluid ring.

Japanese patent application JP 2016 175 563 A (applicant: NTN TOYO BEARING CO. LTD; laid-open date: 6 Oct. 2016) describes a drive unit which has two electric motors and a dual transmission. An air flow is routed through a wing-like air guide arrangement for air cooling to a transmission case. This is said to improve an air cooling of the reduction transmission. The air flow does not appear to affect the interior of the transmission case.

Japanese utility model JP H05-32 863 U (proprietor: MITSUBISHI HEAVY IND LTD; publication date: 30 Apr. 1993) deals with a ventilation or vent chamber, which is adjoined by a bulge or a wall opening in a case.

US patent application US 2017/0 002 919 A1 (applicant: DEERE & COMPANY; publication date: 5 Jan. 2017) deals with a transmission for a tractor, in respect of which a breather tube system is described. A breather tube that can be seen in FIG. 4 of US 2017/0 002 919 A1 opens on the other side into a raised area, which is more clearly visible in FIGS. 5, 6 and 7. A rotation of the input shaft is said to help to reduce the amount of lubricant escaping from the transmission by driving lubricant toward the wall of the breather tube by centrifugal force.

Patent application DE 41 36 392 A1 (applicant: Harnischpfleger Corp.; laid-open date: 7 May 1992) shows, in three exemplary embodiments, toothed wheel gearings which are to be installed in an open-cast mining excavator. Only FIGS. 9 and 10 show a variant in which a case vent is fitted in a vent cover at a location in alignment with which a shaft and a gear can be found. FIG. 10 shows a case vent that has been turned around.

EP 2 332 760 A1 (applicant: KANZAKI KOKYUKOKI MFG. CO. LTD; laid-open date: 15 Jun. 2011) describes an electric drive unit having two electric motors for one vehicle axle. Each unit formed of an electric motor and a transmission is intended to be connected to a wheel. In one of the numerous exemplary embodiments, a breather tube extends between two half-shells of cases of different motor units. A ball check valve may be located on a connection side of the breather tube. The transmissions each have three shafts, which probably do not interact with the breather tube.

U.S. Pat. No. 4,987,795 A (proprietor: Sundstrand Corporation; date of patent: 29 Jan. 1991) addresses the topic of "venting a transmission". A gas overpressure in a transmission case is generated through a transmission input shaft by a compressor. An intermediate shaft, which is designed as a rotating hollow shaft, has apertures, through which the gas enters the shaft interior. A vent tube extends into the shaft interior to a central region and forms a connection to the exterior of the case, toward which the compressed air can flow out. The (active) generation of overpressures requires energy to operate the compressor.

DE 11 2012 000 684 T5 (applicant: AISIN AW CO. LTD; PCT publication date: 4 Oct. 2012) describes a Ravigneaux-type planetary gear mechanism as part of a power transmission device that includes a hydraulic torque converter. A vent tube and a breather chamber, which are to be formed in the countershaft, are said to be provided in such a transmission. The countershaft is said to extend parallel to the output shaft and to be supported by a pair of bearings in such a way as to be rotatable in a transmission case. The countershaft carries a final drive gear which, as the name suggests, is formed at a first end side of the countershaft. A differential ring gear, which meshes with the drive pinion and is coupled to the differential mechanism, is arranged at the other end of the countershaft. Hydraulic oil is said to be used as the lubricating/cooling medium in such a transmission. Any undesired escape of oil from the breather chamber is said to be prevented by a vent tube.

DE 10 2015 105 243 A1 (applicant: GKN Driveline International GmbH; laid-open date: 8 Oct. 2015) deals with a drive arrangement that also has a vent channel. A single electric machine is said to drive two wheels. The document covers two exemplary embodiments of a transmission that can be screwed onto an electric motor; according to the second exemplary embodiment, which is shown in FIGS. 8 and 9, the vent channel is an integral part of the transmission case and extends in an "L-shaped" manner. The vent channel is said to plunge relatively deep into an opening of a drive shaft, so that an escape of lubricant from the vent channel can be prevented. According to the first exemplary embodiment, which is shown in FIGS. 1 to 7, the vent channel is likewise said to be "L-shaped". The first exemplary embodiment refers to to a separate vent tube, which is said to be made of plastic. In the description of DE 10 2015 105 243 A1, it is proposed to use an O-ring, which is seated in an annular groove of the vent tube, to seal off the vent tube with respect to an inner surface of a sleeve-like case portion. Details regarding the venting can be seen in particular in FIG. 3. FIGS. 4 to 6 concern details of a first vent channel portion and show, inter alia, protrusions which are formed in the channel in order to pierce oil foam bubbles.

An integral transmission described in DE 10 2013 208 564 A1 (applicant: Voith Patent GmbH; date of filing: 8 May 2013) is said to be part of a geared compressor system. Such a transmission is said to have a drive gear connected to a drive shaft for conjoint rotation, wherein an axis of rotation of the drive gear is arranged in an arrangement plane with an axis of rotation of the driven gear. Located between these two gears is a large gear that meshes with the two gears, the axis of rotation of said large gear being offset from the arrangement plane in the vertical direction. Each driven gear is connected to two compressors. The aim is to achieve an optimal load distribution. In addition, DE 10 2013 208 564 A1 proposes to design the gears as helical gears. The exemplary embodiments presented in DE 10 2013 208 564 A1 therefore relate to providing not just a first gear but also a second driven gear, the axis of rotation of which likewise lies in the arrangement plane. A steam turbine is provided as the drive. As an alternative, in one exemplary embodiment, two driven gears are driven by an electric machine. A combination of these different drive units on the transmission is also proposed.

Patent application US 2011/0 139 522 A1 (applicants: AISIN AW CO. Ltd and TOYOTA JIDOSHA KABUSHIKI KAISHA; publication date: 16 Jun. 2011) describes a drive device for a vehicle, consisting of two single-wheel drives by independent electric drive systems, each of which is intended to drive one of the two drive wheels, rotating components of said drive systems being said to overlap with each other in the axial direction. Following a detailed discussion of the lengthening of the drive section in the document, it is then proposed to position the axis of rotation of the electric machine lower than that of the output shaft. All four figures of US 2011/0 139 522 A1 show transmissions, each of which is said to have four shafts and two intermediate shafts. One shaft carries the gear known as the "idler gear", which meshes with the rotor shaft gear and with a so-called first gear. In a manner corresponding to the arrangement shown in FIG. 3, these three shaft axles are said to be arranged in a common plane, which extends perpendicular to the axles. The second gear is said to mesh with the output gear. The second gear and the first gear can accordingly form a double gear. The shafts are said to be continuous for the two sub-transmissions and are said to be supported in the peripheral region on the case, so that the gears arranged on said shafts can rotate independently of each other.

According to the title of US patent application US 2014/0 353 052 A1 (applicant: HONDA MOTOR CO. LTD; filing date: 3 Apr. 2014), the document describes a vehicle which is said to represent an inverted pendulum. As can be seen when looking at FIG. 3 (illustration in a side view) and FIG. 4 (illustration from behind) in combination, a left and a right drive unit are attached to the side of the middle axle. Each of these drive units drives a pulley via a belt drive. The drive unit is located above the main wheel of the vehicle. A battery mounted on the vehicle frame serves to supply power to the drive units. The drive units are arranged underneath a seat that is intended to accommodate a single person. The seat is located on a frame, which is supported by a rear support wheel. The very detailed patent application also shows in FIG. 3 a rotor shaft, an intermediate shaft and an output shaft of the drive unit. As can be seen from FIGS. 6 and 7, these three shafts for each sub-transmission are rotatably mounted separately in the case wall and in an intermediate wall. The intermediate shaft is shown positioned higher than the two other shafts, with the output shaft occupying the lowest position.

DE 10 2009 006 523 A1 (applicant: GETRAG Innovations GmbH; filing date: 28 Jan. 2009) deals with so-called tandem motors, the type of electric drives that are realized with two electric machines, a dual transmission and two wheel shafts to be driven on one drive axle. The coaxial shafts are said to be designed as shafts with bearing journals and bearing bores. There are said to be two bearings on the dual input shaft, each bearing supporting against the case two shafts that are coaxially nested one inside the other. In addition, an alternative is mentioned that has two bearings per shaft or shaft part. However, such an arrangement is said to additionally have a central case bearing plate. According to FIG. 2, the respective ends of the nested input shaft stubs should be beveled.

DE 10 2011 115 785 A1 (applicant: GETRAG Getriebe- and Zahnradfabrik; filing date: 6 Oct. 2011) concerns the further development of the transmission described in DE 10 2009 006 523 A1 under the aspect of minimizing the frequency excitation by way of natural frequency shifts between the first transmission and the second transmission. To this end, various solutions are proposed, inter alia by way of overall ratio deviations between the two transmissions, by swapping the individual ratio arrangements in the two transmissions, or by different numbers of gear stages in the two transmissions, etc. In addition, a double shaft bearing of each sub-shaft is described as an alternative embodiment.

US 2018/0 141 423 A1 (applicant: NTN Corporation; filing date: 18 Apr. 2016) deals with transverse forces, especially in the second shaft of a dual transmission comprising three shafts, which thus has two sub-transmissions. As shown in FIG. 4, the transverse forces are minimized by means of counter-rotating helical toothings in the gear pairs to and from the second shaft. FIGS. 1, 6 and 7 show input shafts which are borne at both ends and which are not nested with their neighboring shaft. Furthermore, the transmission according to US 2018/0 141 423 A1 has a support structure.

Patent application US 2017/0 274 763 A1 (applicant: ARCIMOTO, INC.; filing date: 13 Mar. 2017) describes a dual transmission for a drive having two electric motors for example, which can be used in a vehicle, wherein the two sub-transmissions of the dual transmission are arranged in a common case. The two transmissions are each arranged in their own case areas around a central frame. The two transmissions are said to be mechanically decoupled. The two motors are in each case located on the same side of the transmission as the respective wheel to be driven. Of the exemplary embodiments shown in the figures, only FIG. 8 shows a symmetrical transmission arrangement. An intermediate shaft is rotatably mounted on a case cover. The description of US 2017/0 274 763 A1 explains the geometric arrangement of the shafts with reference to FIG. 10. Reference lines are defined between a motor connection shaft and an intermediate shaft as well as between the intermediate shaft and a drive connection shaft, said reference lines being said to enclose an angle of less than 180°. The installation position that is the most suitable installation position is not described for such a transmission.

Problem

Because the economical, i.e. also environmentally friendly use of preferably renewable resources, such as electrical energy, in mobile applications such as electrically powered motor vehicles is still a problem, in particular due to electrochemical energy storage devices, the task of finding ways of optimizing the efficiency is a constant question that arises for a powertrain designer. In addition, a continuous power flow should also be ensured. Also in the case of dual transmissions for a powertrain of a vehicle, an appropriate dual transmission must be specified in which the power flow and efficiency is improved in comparison to transmissions in comparable powertrains. For a transmission that works effectively and that is as compact as possible, special attention must be paid to the way in which the transmission components are arranged to interact. Solutions which are as environmentally friendly as possible are particularly advantageous.

DESCRIPTION OF THE INVENTION

The problem addressed by the invention is solved by a dual transmission according to claim 1.

In addition, the problem addressed by the invention is solved by method according to claim 15 for transmitting power and/or torque.

Advantageous further developments can be found in the dependent claims.

The transmissions, which in particular as so-called reduction transmissions, i.e. as transmissions with a step-down ratio, are parts of electric powertrains, should as far as possible be designed in such a way that, particularly with regard to the limited electrical storage capacity in motor vehicle construction, as far as possible all of the electrical energy is available for the drive, i.e. as little electrical energy as possible should be "consumed" for auxiliary units, other tasks or as a result of power losses.

If the transmission is part of a powertrain comprising two electric motors, the configuration enables so-called "torque-vectoring". The advantages of torque-vectoring come into play in motor vehicles that can travel forward at medium and high speeds. Medium speeds may be speeds of more than 25 kilometers/hour. Particularly high speeds are more than 200 kilometers/hour, for example 250 kilometers/hour. Preferably, such motor vehicles have all-round protection for a driver, such as a passenger compartment or a cab. The cab provides an interior space in which at least one person, preferably multiple passengers, can be located when traveling using the vehicle. Such a passenger compartment is usually a safety passenger compartment, which is a protective chamber in the event of collisions. In addition, a passenger compartment is advantageously designed as a protective chamber against environmental influences, such as lightning, in particular in that the chassis forms a Faraday cage.

In terms of rotation, the two (sub-)transmissions or single transmissions of the dual transmission are largely independent torque transmission units, particularly if an effective coupling via a wheel that can be driven by the (sub-)transmission over a driveway is ignored. The single transmissions are combined as a structural unit to form a dual transmission.

The input shafts of the dual transmission according to the invention and the output shafts of the dual transmission are arranged in a middle region in relation to an extension transverse to a direction of travel, i.e. in particular a relatively short range of a distance from one case wall to an opposite case wall of the transmission case, in particular at the same height. The input shafts and the output shafts define a reference plane within the transmission case. The reference plane is a (substantially) planar area spanned between the input shafts and the output shafts. If the reference plane is compared with the course of a base, either the bottom of the transmission case or the ground on a flat road, the reference plane preferably extends parallel to a flat driveway. The reference plane is advantageously specified in an installed state of the dual transmission or to the intended installation position. It can also be said that a reference plane extends (substantially) parallel to a plane spanned by four wheel carriers, on which four road wheels of the motor vehicle are mounted. The inclination between the reference plane and the spanned plane is preferably less than 10°, in particular less than 5°. The position of the input shafts and the output shafts of the dual transmission defines the reference plane as an (imaginary) geometric configuration within the transmission case.

The transmission case offers multiple positions for gear centers. Two positions for gear centers are occupied by the drive shaft(s) and by the driven shaft(s). A first position is occupied by two input shafts of the dual transmission. One position for gear centers is occupied by the two output shafts. Located between the first position and the second position is a middle or third position, which is not in alignment with the two other positions. This position of a middle axle of one of the gear centers, which is in angular alignment (like parallel) with the reference plane, is provided as a position at a further distance from the transmission case bottom. This can also be referred to as a roof-ridge-like arrangement of the middle axle relative to a loft-like plane. Overall, this elevation of the position of the middle axle in relation to the reference plane gives rise to an axle arrangement of all the gear centers in the manner of a triangle. In this (imaginary) triangle, a first side, preferably a long side, such as a hypotenuse, is preferably brought into coincidence with the reference plane. In this (imaginary) triangle, a second side and a third side preferably form two short sides, which each intersect the first side, in particular at a respective end of the first side, in each case a straight line, such as two legs or such as an opposite leg and an adjacent leg. Straight lines that follow the short sides opposite the first side intersect the reference plane or the first side at an inclination having a value that can be taken from the angle range between approximately 5° and 70°. In other words, the second side and the third side can each form an (imaginary) corner enclosing an angle with the first side. It is advantageous if an angle is selected from an angle range between 10° and 50°. Various mathematical simulations and calculations have led to the situation where angles in an angle range between 15° and 48° appear to be particularly advantageous.

It could also be said that the middle axle can be intersected by a straight line that is led from one of the other gear centers, i.e. the gear centers located to the side of the middle gear center, to the middle axle. An angle that can be applied between the reference plane and the straight line is an angle from the angle range between 5° and 70°, in particular between 10° and 50°, and most preferably between 15° and 48°.

From another perspective, the situation regarding the relative position of the axles can be presented as follows:

The middle axle can be intersected by a straight line that can be formed (in an imaginary or fictitious manner) to one of the gear centers. This straight line deviates from the reference plane. The deviation can be expressed by an angle taken from an angle range between 5° and 70°, in particular between 10° and 50°, and most preferably between 15° and 48°.

Preferably, exactly three positions for gear centers are provided. An advantageous angle range may also be between 23° and 70°. Outside of advantageous angle ranges, for example more than 70° or less than 5°, some advantages of a triangular arrangement of the axles no longer carry much weight.

From a different point of view, the arrangement of the axles of the gear centers advantageously forms an upside-down "V", the respective input shaft and output shaft (approximately) describing a horizontally extending plane with their shaft longitudinal axes whenever the transmission case is installed in a preferred installation position in the motor vehicle.

Owing to the arrangement of the middle axle above the reference plane, it is possible for the two other shafts and thus the reference plane to be located low in the vehicle, i.e. closer to the ground. The center of gravity of the motor vehicle can thus be placed in a low position, for example less than 50 cm or even less than 30 cm from the ground. In other words, the electric machines (operated as electric motors in the mode of operation considered here) that act on the input shafts and drive the input shafts, with their individual weights (due to their copper components), can be mounted in the motor vehicle at a height (as viewed from a road) that corresponds to the position or height (as viewed from the road) of the output shafts. This results in particular in a more stable cornering behavior for a compact case design in the longitudinal direction of the transmission case. If cornering is realized or aided by "torque-vectoring", this increases the permissible cornering speeds. This also ensures sufficient ground clearance to protect the transmission, for example against running onto large stones. According to another aspect, the spaced-apart arrangement of the electric machines increases the total torque that is to be applied by acceleration forces when cornering in order to increase a lateral tilt of the motor vehicle. The compact design in the longitudinal direction creates additional installation space for accommodating electrochemical energy stores, which are preferably installed in the middle of the motor vehicle for safety reasons. If a center of gravity of the motor vehicle is to be placed particularly low, for example in motorsports or in sporty road vehicles, a "V"-shaped arrangement of gear centers for a dual transmission can also be used.

The transmission case is preferably installed in the motor vehicle with its case longitudinal direction or case longitudinal axis along a vehicle longitudinal axis, in particular parallel thereto, preferably even arranged on the central longitudinal axis of the vehicle. The input shafts and the output shafts extend transversely to the case longitudinal direction, i.e. preferably form an angle of approximately 90° with the case longitudinal direction.

It has surprisingly been found here that, by positioning the individual axles of the gear centers in the dual transmission in such a way according to the invention, the power flow between the respective input shaft and the respective output shaft can be guided in such a way that this generates marginal tilting moments and bending moments on shafts and the axle. This has a particularly favorable effect with regard to low power losses and also low noise coming from the dual transmission, particularly during operation with changing loads. The Actio forces can thus be compensated. In particular, tangential force components at the contact points of the meshing teeth of the inter-engaging gears can thus be particularly well compensated.

As an advantageous embodiment, it has been found that the power and the torque are to be transmitted from the respective input shaft to the output shaft via spur gear pairings. In such a constellation, a spur gear intermediate bearing is provided, on which at least one of the spur gears is arranged.

In general, it can be said that a (first) drive power is applied by a first electric machine to a first side of the transmission. A second drive power is applied by a second electric machine to a second side of the transmission. Each of the two sub-transmissions can be operated independently of the other sub-transmission. The two sub-transmissions are preferably arranged as a mirror image in relation to each other. It is thus possible to arrange and support two spur gears on the spur gear intermediate bearing in the manner of a mirror image.

Individual centers of the gears are arranged as if on a triangle, more precisely at corners of the triangle. The arrangement of the gears or of the shafts or of the axles can be compared to an arrangement with a shape of a capital letter "V".

The two shafts of a sub-transmission, the input shaft and the output shaft, are located or arranged with their shaft centers on a uniform plane or at a uniform height, which can also be called a plateau. In this case, the one or more gears on the spur gear intermediate bearing represent one or more deflection stages for a torque.

At least one freewheel body is arranged on the axle, so that the spur gear can be regarded as an idler wheel. Preferably, a plurality of freewheel bodies are provided, such as four freewheel bodies for example. The angle arrangement then contributes to the fact that introduced and diverted to forces at least partially compensate each other. As a result, transverse forces can be compensated, particularly in traction mode.

In this way, it is possible to reduce the effect of the transverse force loads on the spur gear intermediate bearing.

Advantageous embodiments and further developments will be presented below which, considered per se, both individually and in combination, may likewise disclose inventive aspects.

Depending on the respective (selected) type of toothing with its respective toothing geometry on the gears rotating about the respective gear centers, it may be advantageous to arrange the middle axle in such a way, relative to the gear centers of the gear on the input shaft side and the gear on the output shaft side, that a straight line between a gear center and the middle axle is to be formed at an angle, the angle having a value taken from an angle range of 5° to 65° relative to the reference plane. Furthermore, the middle axle may advantageously be positioned in the transmission case in such a way that a straight line between a gear center and the middle axle assumes an angle taken from an angle range of 15° to 48° relative to the reference plane. As a result, not only is the power flow in the respective discs of the gearwheels designed to be low-loss, but also the dual transmission is thus compact overall. Such a transmission can easily be integrated in a vehicle chassis. On account of its compactness, it also has minimized surface areas, which are actually undesirable as sources of sound generated in the transmission.

Further advantageous aspects will be presented below.

The dual transmission with its arrangement of the axes of the gear centers and the respective gear arranged to rotate at the gear center in question is advantageously constructed in such a way that a driven gear, which is designed to rotate about the middle axle, has a direction of rotation rotating away from the case bottom of the transmission case following gear contact with a gear located upstream in terms of drive, i.e. therefore in a driving manner. This not only has an advantage in terms of force compensation, but also in a transmission with splash lubrication can advantageously produce a lubricating film formed of an oil film drawn from the sump. From another perspective, it can also be said that the transmission is designed for a preferred direction of travel. When the transmission is being operated in traction mode, the middle gear is rotated away from the case bottom following contact between the driving gear and a gear on a middle axle. A movement of the middle gear first takes place in the preferred direction of travel.

It may be advantageous that the middle position is formed by a (stationary) axle, in particular an axle fixed to the case, and not by a shaft. Such an axle, which is arranged in the transmission case in a manner fixed against rotation, with idler wheels rotatably arranged thereon, offers the advantage that the transmission case can thereby be stiffened without having to provide additional components for this. The cover-type transmission case parts connected to the axle are also less prone to large-scale emission of structure-borne noise, since in particular resonances can be avoided.

When a stationary axle is mentioned, this means in particular an elongate component arranged in a static manner in relation to the transmission case, said component being designed in an axle-like manner. In the construction sense, this is called an axle if it is a component; otherwise, it may refer to an (imaginary) axis line. An axle can therefore be a force-absorbing component of the transmission. An axle has a cross-section. The axle is in particular arranged in a non-rotatable manner relative to the transmission case, and preferably is fixedly connected to the transmission case.

If the transmission case is composed of several case parts, the axles, in particular of all the gears, can extend (substantially) orthogonally to a connection plane located between two case parts. A connection plane is located wherever there is a transition through edge regions of the case parts that bear against each other in an assembled state of the transmission. In other words, at least one axle, preferably all the axles cross the connection plane in an axle longitudinal direction. From another perspective, it can also be said that the connection plane, which exists in a ring-like manner on a case wall, lies outside of the mounting region of a shaft or an axle. The axles or shafts can be particularly reliably supported or positioned on the case if a respective end region of these shafts is assigned in each case to exactly one case part.

In contrast, as the selected term "shaft" already indicates, the input shafts and the output shafts are rotatable components which are mounted in the transmission case by way of floating bearings and/or fixed bearings. As a result, the power flow into and out of the dual transmission can easily be realized. An input gear and the input shaft may be formed in one piece. An output gear or driven gear and the output shaft may be formed in one piece. Two shafts, in particular the output shafts and the input shafts, respectively, are advantageously arranged in a line, in other words in alignment, one behind the other. This enables, inter alia, the particularly compact design of the transmission as a whole.

Preferably, the gears rotatably mounted on the middle axle are designed as stepped gears, which preferably have a larger, first diameter on the input shaft side or motor drive side. Preferably, the stepped gears are stepped down toward the output shaft side; in this case, they have a smaller, second diameter. This makes it possible to implement a desired step-down ratio while taking up a small amount of installation space. The power flow in the transmission can also be at least partially compensated in this way. The power flow is realized with low losses.

In one particularly preferred exemplary embodiment of the invention, the step-down ratio is achieved in that the dual transmission implements in a first stage (intermediate stage) a ratio in the direction away from the case bottom of the transmission case due to the arrangement of the three gear centers, or the arrangement of the longitudinal axes of the input shaft, the output shaft and the stationary axle for the middle position, in the manner of an upside-down "V", and by means of its second stage (intermediate stage) effects a ratio in the direction toward the case bottom. A ratio toward or away from means that the ratio is linked to a direction of rotation about the gear centers, which, starting in particular from a gear meshing region, is directed toward the case bottom or away from the case bottom. During test operation, this design has surprisingly turned out to be the design that enables particularly low-jerk operation of the dual transmission during load changes.

For a transverse-force-free bearing of the gears of the middle position and a low-loss power flow in terms of bearing losses, which can also be represented by particularly low noise in the transmission, the toothings of the gears on the middle axle are designed in such a way that the tooth meshing of the gears installed in the transmission is free of transverse forces. However, when freedom from transverse forces is mentioned, this does not rule out the possibility that transverse forces may sometimes occur in operating situations. In other words, a continuous loading by transverse forces is as low as possible in the gears with the helical teeth. The angles of inclination of the teeth on the gear in the middle position, in order that these gears have a helical toothing, can be designed with angles of inclination oriented toward each other. The angles of inclination of the two toothing regions of a double gear or stepped gear (for the middle position in the transmission structure) preferably have the same sign. In a lateral plan view of the common axis of rotation of the two gears that have teeth arranged at an angle in relation to the axis of rotation, a common, identical "sign" means that, with reference to a uniform rotation axis direction or gear side, an inclination of the teeth, in particular along a gear circumference, points away from the axis of rotation in the same tangential direction. The inclinations of the teeth on a first gear and on a second gear, said gears being gears arranged for conjoint rotation with each other, ideally run in the same direction, i.e. not in different directions (as in the case of an arrowhead). These can therefore be referred to as a first and a second row of teeth of the double gear or stepped gear, said rows being aligned next to each other and parallel with each other. The angles of inclination of the first and second row of teeth may be different from each other. The angles of inclination are preferably set in such a ratio that, despite different pitch circle diameters of the gears, a transverse force of approximately equal magnitude, but directed in opposite directions, results from each of the two sub-transmission stages formed by the double gear or stepped gear.

Specifically, the value of the individual angles of inclination can advantageously be determined by a calculation method, for example. A favorable ratio between two angles of inclination exists if the transverse forces formed by two gear stages, i.e. in particular forces based on the angles of inclination in the direction of the adjacent leg, largely cancel each other out. For example, for specified gear diameters $d_2$, $d_3$, the angle of inclination $\beta_1$ of the first stage and the angle of inclination $\beta_2$ of the second stage can be determined using the following formula:

$$\tan\beta_2 \doteq \tan\beta_1 * \frac{d_3}{d_2}$$

The term "tan" describes the tangent of the respective angle. The angles $\beta_1$, $\beta_2$ can be specified in relation to a straight line as a design aid, which bears against a tooth of the gear in a direction parallel to the axis of rotation. The diameters $d_2$ and $d_3$ are the diameters of the gears of the stepped gear, the diameter $d_2$ being assigned to the first stage or first reduction stage of a single transmission and the diameter $d_3$ being assigned to the second stage or second reduction stage of the single transmission. The stages preferably comprise further gears, for example an input gear of diameter $d_1$ in the first stage and a driven gear of diameter $d_4$ in the second stage. The diameter $d_2$ can also be referred to as the pitch circle diameter of the larger gear of the stepped gear, and the diameter $d_3$ can also be referred to as the pitch circle diameter of the smaller gear of the stepped gear or of the stepped pinion of the stepped gear. Preferably, the first stage or stage 1—as seen in the torque flow direction—is closer to the drive motor. This stage can be referred to as the input stage. The second stage or stage 2—as seen in the torque flow direction—is closer to the output or the road wheel than the first stage. The term reduction stage is based on the assumption of a torque flow direction from the drive motor.

In other words, according to the formula given above, the ratio of the tangent of the angle of inclination of the second stage to the tangent of the angle of inclination of the first stage is (almost) identical to the ratio of the diameter of the gear of the stepped gear that is involved in the first stage to the diameter of the gear of the stepped gear that is involved in the second stage. A single transmission is considered here. In this way, possible transverse forces on the stepped gear of a working single transmission or of the two identical single transmissions largely cancel each other out. When an equal size or an identical ratio is mentioned when forming the ratios, deviations caused by customary manufacturing tolerances are ignored. Deviations that are less than 20% of a ratio from the above formula can still be understood as an equal size or an identical ratio. Preferably, the transverse forces are canceled out at least for proportions that are more than 20% of the possible transverse force in a single stage.

Friction effects, more precisely friction effects in tooth meshing regions, can also be taken into account in the calculation method, as a result of which an even better compensation of transverse forces is possible.

Possible tilting forces, the strength of respective moment is defined by the width of the double or stepped gear, can be—likewise greatly—reduced by the ratio of the angles of inclination.

During operation, no axial forces or only slight axial forces occur on such toothings in relation to the bearings of the gears, as a result of which this design measure has a favorable effect on the power loss of the dual transmission. In addition, helical toothings guarantee particularly low-noise operation of a transmission. Such toothings also enable the transmission of relatively high powers while taking up a relatively small amount of installation space, since multiple teeth are always meshing.

Further interesting aspects will be explained below which, considered individually and also in combination, disclose further inventive aspects.

The gears arranged on the axle are borne on the axle by means of suitable bearings, in particular in the form of needle bearings or rolling bearings with or without an axial support function. The use of needle bearings, in particular, ensures a tilt-free bearing of the gears and thus a minimized friction between the toothings thereof.

It may be advantageous to use thrust washers to axially support the gears in the transmission case.

It may also be advantageous to use a sleeve to bear the gears arranged on the axle, said sleeve having an air-guiding structure which leads out of the transmission case and can be used to vent the transmission case.

The dual transmission can also be described using the following words, which likewise present interesting further developments and possibly stand-alone inventive aspects.

A first (sub-)transmission and a second (sub-)transmission preferably lie next to each other. They have (substantially) identical, but at least almost identical or highly similar designs in terms of their ratio stages, their gears, the arrangement of the gears, the resulting overall ratio, and the arrangement and bearing of the individual gears. The (whole) transmission can thus be regarded to as a pairing of two (sub-)transmissions, so that the (whole) transmission can be referred to as a twin transmission.

The twin transmission is provided to connect two input drive machines, in particular electric motors or electric machines, via the transmission to two half-axles arranged on the output side of the transmission, such as, for example, two universal shafts (joint shafts) for connection to in each case one road wheel. In order to connect each of the two electric motors to a respective input shaft, the twin transmission has a dual input shaft, to which the two electric motors can be connected.

In terms of rotation, the two (sub-)transmissions of the twin transmission are largely independent torque transmission units, particularly if an effective coupling by a driveway via a respective wheel that can be driven by the (sub-) transmission is ignored.

The motor vehicle powertrain that includes the twin transmission is a powertrain which, as stated, is to be driven by electric motors. At least two electric motors are connected to the twin transmission.

Ideally, each electric motor drives a road wheel assigned thereto. The electric motor is advantageously responsible for driving one single road wheel. The torque of the electric motor is connected through or transmitted to a single wheel via a (sub-)transmission of the twin transmission in order to drive the single wheel of the motor vehicle.

The input shaft of the twin transmission is designed as a dual input shaft so that a separate electric machine can be connected on each side of the transmission. Consequently, a (pure) electric drive of the motor vehicle can be referred to if the presently described powertrain is treated together with the transmission.

The dual input shaft is designed for the connection of two motors which are to be operated separately. The dual input shaft offers connections for two motors. Asynchronous electric machines or electric machines operating in a manner similar to asynchronous electric machines, which can "break loose" at an elevated drive torque depending on the off-phase position between the rotor and the actuation of the windings of the stator, are advantageous.

By virtue of its dual input shaft, the twin transmission is designed in such a way that two ratios (operating separately) can be derived from the dual input shaft. For this purpose, the dual input shaft has two first gears, which in particular can be placed centrally on the dual input shaft, preferably designed as part of the dual input shaft. The ratio or the two ratios of the first two gears are formed by combining these with two second gears of the twin transmission.

The first gears are located side by side, one gear on each input shaft. Each input shaft has its own first gear. The two first gears are located in the center or in a middle region of the dual input shaft. The input gear and the input shaft may be formed in one piece.

In one advantageous embodiment, the two first gears are located in the region of a respective end of a respective single input shaft. For a precisely guided and borne input shaft and in particular for a load distribution over multiple input shaft bearings, it is even more advantageous if the end region of at least one of the single input shafts comprises an extending journal region, wherein the extension protrudes beyond a gear cheek of the first gear by less than two and a half times the width of the first gear wheel, namely preferably in the direction of the second single input shaft. The journal region may in particular protrude into a journal receptacle of the second input shaft.

In other words, the dual input shaft is a shaft composed of two shafts that are pushed one inside the other. The dual input shaft can also be referred to as a partially nested shaft. The two single input shafts are (conceptually) pushed toward each other. For this reason, one input shaft is the partly outer shaft, which offers a central cavity region, into which the other input shaft protrudes. Such a dual input shaft is designed as a partially nested, inter-engaging shaft in such a way that in each case one motor can be connected to each single shaft. For this purpose, each single input shaft is designed to be cantilevered at its end. Another term for such a shaft is a piloted shaft.

The design of the input shaft is particularly compact if the first gears arranged on the input shaft and protruding therefrom are arranged so close to each other that the space between the two first gears can (ultimately) only be referred to as a separating air gap between the gear cheeks. In one embodiment, a support structure may be arranged therein.

The dual input shaft is supported at multiple points within a case of the transmission. It has proven to be particularly advantageous if the dual input wave is supported at four points in total. In this case, each single input shaft can be supported against the case at two points, and therefore the dual input shaft is supported against the transmission case at four points.

In this way, it is even possible to divide the case into two parts without a central stabilizer or central support structure. Although no stabilizer or other central support structure is provided, it is possible to refer to separate gear compartments. The case of the transmission exhibits two sub-regions in its case.

Owing to the dual input shaft comprising shaft portions or sub-shafts pushed one inside the other, i.e. owing to the nesting of the single input shafts and the formation of a dual input shaft, a twin transmission is made possible which is extremely narrow in its input region. In addition, if the gears, which may be part of the input shafts, are placed as close to the center of the dual input shaft as possible, the thickest area of the shaft design of the dual input shaft can be found in the region that has just been created by the placement of the gears.

Further advantageous embodiments and further developments will be presented below which, considered per se, both individually and in combination, may likewise disclose inventive aspects.

The dual input shaft, composed of two single input shafts, has a first end and a second end. The two ends of the dual input shaft can be referred to as extremities because these ends protrude from the transmission case. The extremities are designed as connection points for force-fitting connections. Via these, a respective drive can be connected to the twin transmission. The extremities are intended for drive couplings. Advantageous profiles for coupling drives to the dual input shafts are, for example, splined shaft profiles. If splined shaft profiles are formed at the extremities, force-fitting connections can thereby be achieved on the shaft casing and/or shaft end face of an input shaft. In addition to splined shaft profiles, other profiles can also be used. For example, groove structures can be formed in the extremities of the dual input shaft so that a toothed engagement of a separate drive can take place on each extremity. A toothed engagement of two shaft profiles one into the other can also be referred to as a form-fitting connection. Preferably, a form-fitting connection enables a rotational force to be transmitted from one shaft to a shaft connected thereto, such as a motor shaft and an input shaft. The rotational force is preferably transmitted between a shaft casing and a shaft end profile, which can also be referred to as a shaft core, wherein in particular the shaft casing is provided on a first shaft or sub-shaft and the shaft core is provided on a second shaft or sub-shaft, preferably on the profiled extremities thereof intended for a connection. The shaft casing has a smaller diameter than the shaft core. A drive connection can be formed by connecting the shaft casing and the shaft core. If both extremities are formed with a profile as a shaft core, a force-fitting and/or form-fitting connection of the drive to the input shaft can be established by means of a shaft casing formed separately as a sleeve.

The case of the transmission advantageously has multiple attachment points. Some of the attachment points can be used to connect drive machines. Two electric machines to be attached to the transmission in a force-fitting manner via end flanges can form a block-like unit with the twin transmission by screw fastening (or some other suitable fastening method).

The twin transmission is particularly compact if the dual input shaft is designed as a particularly short shaft. A short input shaft can be achieved by way of stub shafts. The dual input shaft can be produced by two stub shafts aligned along an axis. In this case, the stubs of the stub shaft are oriented in opposite directions. The stubs of the stub shafts terminate the dual input shaft in opposite directions.

Advantageously, the respective stub shaft diverges outward at its end remote from the stub. This foundation-type design of the stub shaft can be used to incorporate a circumferential gear rim integrally in the bottom of the stub shaft. Such a gear rim can at the same time form the drive gear. The widest diameter of the stub shaft would be the diameter that merges into or forms the drive gear.

The connection to be established between one of the drive machines and the dual input shaft in order to transmit the drive can be achieved by way of a drive connection. As mentioned in the introduction, the dual input shaft has support points. Advantageously, in each case two circumferential bearings are provided on a part of the case and on a respective single input shaft. Each part of the dual input shaft intended for a drive has two bearings on the other side of its drive connection. These two bearings are supported on parts of the case of the twin transmission.

Advantageously, the dual input shaft is an oil-lubricated shaft. The dual input shaft may be designed as a stepped shaft. The oil lubrication takes place in such a way that excess oil (superfluous oil) can be collected in a case pan. The oil from the case pan is first supplied directly to the rolling bearings, which may be exposed to high loads. In one advantageous design embodiment, the transmission has two case pans. The dual input shaft lubricates opposite to two case pans or using the oil from two case pans. Here, a widest diameter is advantageously in the region of a center of the dual input shaft, which is composed of two single input shafts. The two gears of the dual input shaft are supplied with oil from gears located at a lower position, which is effectively transferred from tooth to tooth from the sump. In addition, an oil distribution takes place in a speed-dependent manner by way of oil splashes or by way of oil mist.

When looking in different directions from a center of the dual input shaft, it is possible to see outer bearings. The bearings arranged furthest outward are ball bearings. Lateral migration of one or the other shaft of the dual input shaft can be blocked by a respective abutment of the ball bearings against the dual input shaft and against a case part of the twin transmission.

The bearings of the dual input shaft can be paired into pairs of two bearings. Preferably, a deep groove ball bearing and a cylindrical roller bearing are combined next to each other. As a result, it is possible that in each case one deep groove ball bearing and one cylindrical roller bearing centers a half-shaft or a single input shaft relative to the case of the twin transmission. In each case two bearings, preferably one deep groove ball bearing and one cylindrical roller bearing, can center one of the two shaft-like parts of the dual input shaft relative to the twin transmission as a result of being combined next to each other. Preferably, the cylindrical roller bearing is located next to the gear rim or the driven gear of the stub shaft. Preferably, the deep groove ball bearing laterally bounds the cylindrical roller bearing. The two parts of the dual input shaft that are inserted one inside the other, i.e. the single input shafts, are bound by their respective outer deep groove ball bearing to prevent lateral migration. The output via the respective driven gear leads to predominantly radial loads in the largest part or the part having the largest diameter.

In addition to the outer bearings of the dual input shaft, there are also inner bearings. To distinguish them from the outer bearings, the inner bearings can also be referred to as dual input shaft bearings, inter alia because the inner input shaft is supported against the transmission case in a radial direction via the inner bearing and via a first outer bearing as well as preferably a second outer bearing of the outer input shaft. According to a further aspect, the inner bearing may also be designed as a double bearing. It is also possible that the two outer bearings are each designed as double bearings, as has already been explained. The reference to an inner and an outer input shaft does not mean that this is a known concentric hollow shaft configuration, since an overlap region of the two shafts is preferably less than half, in particular less than one-third of the length of the dual input shaft.

The bearings arranged inside the dual input shaft, i.e. the bearings between the two single input shafts, may be designed as plain bearings. Advantageously, each plain bearing has a different diameter than the other plain bearing. The shafts engaging one inside the other can be supported against each other by means of the plain bearings.

Advantageously, the plain bearings are arranged in a relative relationship to the outer bearings. In fact, it is possible to position at least one of the plain bearings below a pair of two outer bearings. The at least one plain bearing is aligned in the region of the respective two outer bearings. The plain bearing is thus arranged inside the outer bearings. For instance, it is possible in particular to position in each case one plain bearing below two outer bearings.

If speed differences between the two input shafts should occur repeatedly, preference is given to needle bearings in place of the plain bearings. Needle bearings generally run with less friction than plain bearings. Needle bearings can be arranged in the same way as previously described for the plain bearings. An arrangement of two needle bearings next to each other is advantageous for load distribution and in particular for bearing lubrication. A first needle bearing may be located in the vicinity of the gear cheek between the journal and the journal receptacle. A second needle bearing is preferably assigned to an end region of the journal. The end region of the journal is located at an air gap between a journal end face and a journal receptacle bottom. Recesses for the needle bearings may be formed in the journals, said recesses being in the manner of a circumferential groove and forming in particular radially arranged, inner running surfaces of the needle bearing. An outer running surface, as viewed radially, is preferably provided by a cylindrical inner wall of the journal receptacle.

The needle bearings or plain bearings can be lubricated with oil through at least one oil guide bore in the dual input shaft. An oil guide bore may extend for example in at least one of the single input shafts and open into an air gap in the journal receptacle, which can also be referred to as a lubrication gap. Preferably, at least one oil guide bore starts from a lubrication chamber in the vicinity of a deep groove ball bearing of the single input shafts, which is likewise supplied with oil. Such a needle bearing runs very reliably and can be installed with relatively little effort.

Further very interesting and also advantageous embodiment features can be described as follows.

The dual transmission, the transmission case of which can be based on two half-shells, in the interior of which a stand-alone transmission is realized, is constructed as a paired transmission, i.e. in an almost twin-like manner; another term for this is a twin transmission. Such a twin transmission is part of a motor vehicle powertrain. The motor vehicle powertrain includes two electric machines. Using the transmission, each electric machine is designed to drive a road wheel assigned to the respective electric machine. From one electric machine, the flow of torque to one of the road wheels is provided using half of the transmission.

The transmission includes gears, in particular spur gears, and rolling bearings, which are to be lubricated by means of an oil film. The gears and rolling bearings are located in the interior of one of the sub-cases. The oil lubrication preferably takes place in a passive manner, i.e. the oil film is distributed by rotational distribution by means of gears (splashing). It can also be said that the gears entrain the oil film. After being at a standstill (for a relatively long period of time), the oil film is gradually distributed over all the gears and rolling bearings, in particular by building up the oil film again. The gears and rolling bearings are designed to be lubricated with oil. The oil lubrication takes place in the interior of the transmission case.

However, the transmission is not completely filled with oil, but rather the total available volume (in each sub-transmission) is greater than the volume taken up by the oil in the interior of the transmission. Therefore, at least one of the gears is at least partially in an air environment, but as a result of its lubrication and its rotations may be separated from the air by an oil lubrication film.

The transmission, which can also be referred to as a twin transmission, is preferably equipped internally with an air-guiding structure, by which air can be routed outward from the interior of the transmission, i.e. out of the transmission, particularly in cases where an air overpressure occurs within the transmission, for example due to rises in temperature, expansion of the lubricant, or accumulation of particles and dirt. The vent structure includes a part that can be referred to as a vent channel. The vent channel contributes to the venting, inter alia in that air collected in the channel can be routed onward (indirectly) to an air exchange point between the interior and the exterior of the case. The point of transition between what is ascribed to the interior of the transmission, in particular the twin transmission, and what is ascribed to the exterior can be referred to as the actual vent. This vent vents air, in particular pressurized air or air at a pressure level different than that on the other side of the vent point.

The vent channel is advantageously routed along a region of the transmission that can also be referred to as a stationary region in the transmission, said transmission otherwise being intended for rotational movements (of its components such as gears).

The vent channel extends in a stationary axle of the transmission. The stationary axle within the transmission is used to vent the air from the interior of the transmission. Such a stationary axle may extend from one sub-transmission to the other sub-transmission. If individual gears of the transmission or shafts are arranged on the axle, or if a stationary axle is selected that is transverse to such shafts, then this can be referred to as a stationary cylindrical region in the transmission. Such a cylindrical region may be a gear axle. The gear axle is then referred to as the stationary axle. The transmission can release air to the outside via the stationary axle. In the same way, the interior of the transmission can be supplied with air from outside via the stationary axle.

One possible, advantageous arrangement is achieved by selecting an axle through the transmission which is of such a type that this axle can at the same time be regarded as a "threading axle" for individual gears of the transmission. In one advantageous embodiment, the axle via which venting takes place is at the same time a threading axle for gears.

One alternative, possible, advantageous arrangement is achieved by selecting an axle through the transmission which is of such a type that this axle extends transversely to rotating shafts in a region beyond the shafts, for example between two shafts of the same type as the output shafts, i.e. between the end faces of two aligned output shafts. In other words, the vent channel extends perpendicular to a gear axle.

The aforementioned venting by means of a vent channel in order to release air, in particular pressurized air, from the case of the transmission can take place with the aid of a multi-part vent. The venting takes place by using the vent channel and preferably a multi-part vent.

In one particularly advantageous embodiment, the case, when it is installed in the direction of travel, is longer than it is wide in relation to the direction of travel. The width, i.e. the extension transverse to the direction of travel, is usually smaller than the length in the direction of travel. Individual widths of the case can be defined in this transverse direction.

It is advisable to provide at at least one point within the transmission a sleeve-like, elongate, cylindrical, round metal shape, which can be referred to as a stationary sleeve. In one advantageous embodiment, the vent channel may be created by such a stationary sleeve. It is advantageous if the sleeve extends over most of one of multiple shorter widths of the case. A middle region of the case may be selected as a suitable location in which such a vent channel is placed.

The vent channel may discharge air from other cavities that exist in the interior of the case. Air may also enter the vent channel via transverse bores and escape or propagate in the transmission in the opposite flow direction. Transverse bores preferably perform at least two functions. There are thus further cavities in the interior of the case. Preferably, the air is discharged from the interior of the transmission in the course of or as a result of a pressure equalization. As a result, air can be released to the outside via such a vent.

A venting of pressurized air, whereby the air is to be discharged from the case of the transmission, takes place along a vent channel and a multi-part vent. The vent channel is advantageously realized within a stationary component, such as a stationary sleeve for example. In the case of a stationary sleeve, said sleeve extends in the interior of the case. The stationary sleeve has a certain length. In one embodiment, this length (substantially) corresponds to a width of the case. The sleeve extends from the inner side of one half-shell of the case to the other inner side of the half-shell of the case. The sleeve is thus designed to almost completely cover such a width. In a further embodiment, this length (substantially) corresponds to half the width of the case. In other words, the length of the vent channel or of a component that forms the vent channel, such as a sleeve, may be up to 25% less than the full or half width of the case. The sleeve starts at a middle region of the transmission and extends to an inner side of the case. The middle region may be, for example, a support point for a pivot bearing or rolling bearing, said support point being non-rotatable relative to the case. According to a stiffening aspect, therefore, the component that includes the vent channel preferably forms a strut from the interior of the case, or through the interior of the case, to the case wall.

The venting component, for example the sleeve, is advantageously arranged in a middle region, in particular in relation to the direction of travel of the motor vehicle accommodating the transmission. The vent channel, in particular a flow passage region of the channel, may open into the interior of the transmission. The vent channel advantageously has transverse bores. Air can be taken in via these transverse bores. The air entering the interior of the component, for example the interior of the sleeve, is then released to the outside, i.e. outside of the transmission case.

By using stationary regions in the transmission, oil retention can be achieved, in particular in a manner operating under the effect of gravity.

Other advantageous embodiments and further developments will be presented below which, considered per se, both individually and in combination, may likewise disclose inventive aspects.

The vent channel may advantageously be created by a separate component, for example by an internally hollow, elongate, cylindrical shape that can also be referred to as a "sleeve". The inner cavity of the sleeve may be a bore. In order to be able to conduct air from the exterior of the component, for example the sleeve, i.e. from other inner regions of the transmission, to the interior of the component, for example the sleeve, said component, for example the sleeve, is provided with a number of bores which are ideally evenly spaced and are preferably aligned with a radial component in the sleeve. The component (the sleeve) creates the actual vent channel. The component at the same time serves to stabilize the elongate cavity in the interior of the transmission that is provided for venting purposes. The component may have a plurality of vent channels, such as a branched vent channel system, which is preferably continued by channels located inside the case wall. A channel in the case wall may open out into a region of the case interior that has no oil level or into an oil collection space.

In other words, the vent channel described above can also be referred to as an air-receiving space.

In one advantageous embodiment, the space (compartment), which may in particular be cylindrical, should pass through the entire case at least once, said case in particular being composed of sub-cases. Such a transmission or transmission case can be produced in that the space extends from a first inner side of the case to an opposite, second inner side. The space thus passes through the interior of the transmission. The case is penetrated by the cylindrical space. One suitable component for creating an elongate, in particular cylindrical space is a sleeve of appropriate length.

In an alternative embodiment, the length of the air-receiving space is only half as long as a width of the case in that axis of the vent channel. Advantageously, such a vent channel starts at a central axis of the transmission. From the starting point, the vent channel may extend transversely to the axis.

Such a venting component, for example the sleeve, may be perforated by bores, which in particular go in different directions. A central cutout, such as a central bore, may be provided in the center of the sleeve, more precisely along the axis of the sleeve. If the cutout or the cylindrical space is produced by means of drilling, it is advantageous, particularly from a production point of view, if the bore has been produced with a constant cross-section.

In the context of a multifunctionality of the component, a cylindrical hollow shape of the component is particularly advantageous, which is connected to bores in the case wall. Inter alia, through the bores in the case wall, oil can enter the cylindrical cavity, which preferably forms a first segment of the vent channel. In particular, needle bearings which extend around the cylindrical metal shape or sleeve as stepped wheel bearings can be lubricated through transverse bores. The cylindrical cavity may serve as an oil reservoir, from which oil passes to the needle bearings, preferably through lubrication openings which converge conically in the radial direction and which in particular open out next to a running surface of the needle bearing. Another segment of the vent channel may be a side wall channel, which extends parallel to the cylindrical cavity and opens into the latter at a passage opening. The side wall channel has for example a diameter of 3 mm to 7 mm and is therefore dimensioned smaller than a diameter of the cylindrical cavity of for example 18 mm to 30 mm. If a flow resistance or a flow barrier for oil, such as an opening in particular with a flap or a separating element, is provided in the vent channel or at one end of a narrow region of the vent channel, oil can be even better separated from air flowing out. By designing one region of the vent channel in an angled manner, oil is retained in the transmission interior. A gradual reduction in a flow cross-section of the vent channel from the transmission interior to the outside is also advantageous for oil retention.

In one advantageous embodiment, the venting component, i.e. the sleeve, in particular the exterior of the sleeve, may advantageously be used as a bearing surface, i.e. as a bearing for an idler wheel. If the sleeve extends both in one sub-transmission and in the other sub-transmission, the sleeve may be used as a bearing for at least two identical idler wheels, namely one idler wheel in each sub-transmission. In other words, the vent channel extends in the interior of the component that provides the vent channel, and at the same time the exterior of the component is used as a bearing for idler wheels seated in a rotatable manner on this bearing. If the idler wheels are stepped idler wheels, pairs of idler wheels that are formed in particular of a larger gear and a smaller gear can be born jointly on a portion of the vent channel or sleeve. A stepped idler wheel may be formed as a welded assembly of two idler wheels connected together for conjoint rotation. The diameters of idler wheels configured in this way are different. The larger gear has a larger diameter than the smaller gear. If the gears, which are to be referred to as the large gear and the small gear, are produced in such a way as to form a synchronously rotating whole gear, for example connected together by a join (in the sense of a stepped gear), the exterior of the vent channel is used to bear the stepped gear. The assembly, which may include a sleeve for example, and gear pairs borne thereon can thus be used to form a freely rotating spur gear ratio stage. Each spur gear ratio stage belongs in a separate sub-transmission.

In one particular further development of the present invention, the respective spur gear ratio stage may be a stage of an at least two-stage reduction transmission. The stepped gear is in particular arranged as an intermediary gear between the first stage and the second stage. It may also be referred to as a second, for example middle, ratio assembly, which includes the stepped gear. The stepped gear meshes with a first gear, an input gear, and a second gear, an output gear, as a result of which in each case a ratio stage is formed. The stepped gear or the ratio assembly of the stepped gear occupies a spatial area in the transmission case interior. The spatial area may at least partially include a vent channel. Preferably, the stepped gear is rotatable around a region of a vent channel, into which in particular lubricating oil can pass or from which lubricating oil can emerge.

In a further advantageous embodiment, the vent channel may be routed through between two bearings. If the bearings are realized by rolling bearings or plain bearings, for example with bearing rings, the bearings have an orientation that becomes obvious for example by a cut in the transverse direction relative to the shaft to be borne. The bearings, which for example are ring-shaped, may be cut through their rings at one point in the manner of a secant, which corresponds to an orientation of the bearing.

In addition to the fact that both a vent channel and the actual vent, the venting device, for example in the form of an overpressure valve, may be provided as assemblies, parts or components of the vent, a connecting line may be provided between the individual components of the vent so that the vent is led to the vent channel. Such a component may be, for example, a vent feed line. The vent feed line connects the air, preferably coming from the vent channel, to the vent. Advantageously, therefore, the vent is formed of multiple parts or multiple components. The exterior of the vent channel, for example its sleeve, may be equipped with a further tubular, in particular elongate, (long) hole, which forms a vent feed line in an edge region, for example transversely to the actual vent channel or parallel to the actual vent channel. The vent feed line may be shorter than the actual vent channel. In this case, the vent feed line is an upstream stage of the vent channel, which is of reduced diameter and in particular decelerates and reduces in particular internal flows in the case.

In one advantageous embodiment, the vent may be covered by a breather cap in the region of transition to the outside, i.e. where the vent channel continues outward. A venting of the tube can be achieved by means of such a breather cap, the breather cap comprising for example a single needle seat. The needle seat may serve as a needle bearing for a valve needle. The breather cap opens as a result of pressure gradients, for example because it operates as an overpressure valve or comprises an overpressure valve. Such an overpressure valve may be a type of overpressure valve that operates with a flat seat. It is particularly advantageous if the breather cap is equipped to open when there is a difference in pressure between the inside and the outside and remains closed when there is no difference in pressure, for example in that a valve actuation force is provided by the difference in pressure.

The loading of the vent channel with oil can be reduced by selecting for the vent and its components a location within the case that is arranged above a maximum level of the oil. If the position of the vent is carefully selected such that even tilt angles of the transmission that remain below an upper limit, such as 40°, 45° or 50° for example, bring about only such a slight change in position of the transmission by which the oil present in the sump does not enter the vent channel, a risk of oil entering the vent channel is reduced even on rough terrain, when driving on a bumpy track or in the event of inclined driving movements. The maximum level is not undershot, even if the transmission is tilted by a relatively large angle, such as 40°, 45° or 50° for example, in relation to its regular installed position (for example on account of the vehicle traveling up a mountain).

The vent may additionally be designed in such a way that a torsional resistance of the transmission case is provided by the vent. The vent establishes an assembly orientation if it is designed in such a way that, owing to the vent, only a single assembly orientation of the transmission case is possible. It is thus possible to manufacture initially identical transmission case halves, for example by die casting, wherein the vent is installed in one of the half-shells, i.e. in one of the transmission case parts, as a result of which the initially identical transmission case half-shells differ from each other. For example, the right transmission case shell differs from the left transmission case shell on account of the sleeve that is to be installed.

The entire vent route, starting at the vent channel, can be divided into individual portions. Even the actual vent channel can also be divided into different portions. It has proven to be particularly advantageous if the vent channel is a channel structure guided in parallel and equipped with different diameters. A thicker portion, which is advantageously arranged centrally, is accompanied by a narrower portion arranged laterally. The narrower portion is located outside the thicker portion and extends parallel to the latter.

As stated, the vent channel may be composed of multiple parts and/or of multiple portions. For example, the vent channel may be composed of two different portions. A first portion is thicker or is having more capacity than a second portion. The two portions may extend parallel to each other and may even be arranged in the same direction in the sleeve. If the narrower portion is arranged upstream of the thicker portion, the narrower portion serves to throttle the oil, as a result of which even oil mist that has entered the relatively large vent channel can be held back.

The individual portions, which for example perform functions such as collecting the outgoing air, separating oil, holding back oil, or making it more difficult for oil to pass, for example in the event of tilting of the vehicle carrying the transmission, may be connected to each other by transition regions. A vent structure may be formed in the transmission by way of a convoluted, interlaced or multi-deflected channel structure, in particular with the addition of transition regions, i.e. for example starting from the thicker portion of the vent channel, connecting through a first transition region, merging into the narrower portion, then equipped with a further transition region leading to the vent feed line and opening into the vent, which vent structure on the one hand holds back transmission oil but on the other hand ensures a reliable venting that is as free of oil as possible, even though a relatively large area or a relatively large portion in the form of the vent channel is formed at a stationary position in the transmission. In addition, transition regions may also be provided between the individual portions, which transition regions may for example establish an individual connection between a first portion having a certain diameter and a second portion having a different diameter.

The escape of oil, regardless of whether this is as an aerosol, as droplets or as a film, can be further reduced by providing multiple deflection.

One component that can be assigned to the case is the spectacles-type bearing bracket, which from one perspective can be regarded as a partition element of the (sub-)transmission.

The dual transmission has a common spectacles-type bearing bracket as a component that is common to both output shafts, namely a first output shaft and a second output shaft. The spectacles-type bearing bracket, via its cuff around its ring-shaped internal opening, supports the respective output shaft extending into it at one end. In other words, the two output shafts, which in particular are arranged with a respective end face parallel to and opposite each other in the spectacles-type bearing bracket or the opening thereof, with the two end faces preferably being spaced apart from each other, lead out of the spectacles-type bearing bracket into a region outside the case of the dual transmission.

It is particularly advantageous if the spectacles-type bearing bracket is arranged centrally. The spectacles-type bearing bracket is located in the middle, so to speak, between two transmission case half-shells. From a different perspective, the spectacles-type bearing bracket is the central, middle component that separates the single transmissions of the dual transmission from each other. The spectacles-type bearing bracket divides the transmission chamber of the dual transmission into a left half and a right half (in the direction of travel). Across a boundary surface, which can be used as a design aid, between the two halves of the dual transmission on which the spectacles-type bearing bracket extends, a flow or exchange of transmission oil takes place, but not a transmission of torque.

A spectacles-type bearing bracket, which may be provided in the dual transmission as a component thereof, may exist around a hole structure. The hole structure is in the center of the spectacles-type bearing bracket. The central hole, the hole structure, is designed to receive two ends of driven shafts, i.e. a first end of a first driven shaft and a second end of a second driven shaft.

Such a spectacles-type bearing bracket may be installed in a dual transmission of the type presented above.

In one advantageous embodiment, the output shafts are supported by a single spectacles-type bearing bracket in an end region of the output shafts. The spectacles-type bearing bracket, which is referred to as "spectacles-type" because two output shafts are supported, could also be referred to as a monocle-type bearing bracket because the output shafts jointly extend longitudinally along a line such that the radii thereof overlap when viewed perpendicular to the case longitudinal direction. The spectacles-type bearing bracket preferably has a single, in particular central, hole structure. The hole structure preferably receives two respective driven shafts at one of their ends. The hole structure comprises in particular two floating bearings. Each floating bearing can support one wheel half-axle, particularly when a shaft of the wheel half-axle extends into the transmission case. The spectacles-type bearing bracket is preferably attached to a support structure in the case interior. There is no need to provide sealing surfaces between the spectacles-type bearing bracket and the case. Such sealing surfaces could leak due to mechanical loads in continuous operation. The transmission may be equipped with a single sub-case connection surface.

In one advantageous embodiment, two barrel bearings are in place in the spectacles-type bearing bracket. Each barrel bearing is intended to receive one end of one of the output shafts. The respective barrel bearing receives one output shaft. With regard to an axial extension, such a barrel bearing can be referred to as an outermost (or innermost, depending on the viewing direction) bearing for a wheel half-axle or wheel drive shaft. In addition, a further bearing on the transmission case takes place via a ball bearing, such as a deep groove ball bearing.

Advantageously, for the projection (cantilever), a value for the angle α is selected that leads to the radial force transmission from a first gear to a second gear being minimized. In one embodiment, the first gear may be designed for a direction of rotation to the right (in the case of a motor drive). The second gear is designed for a direction of rotation to the left (in the case of a motor drive). The teeth of the gears have tooth flanks (inclinations or angled tooth surfaces). With this angle setting or inclination, a tooth of a first gear drives a tooth of a second gear. The transmitted driving forces can be split into their radial and axial components. While the radial component is intended to be transmitted as well as possible, it is desirable if the axial component is largely compensated, for example the remaining order of magnitude of the force is now only in the single-digit percentage range compared to the radial component. The angle α of the projection corresponds to the tooth flank steepness of the teeth of the first and/or second gear. The angle α of the projection is defined inter alia by the gear radii of the first and second gear. For a start of considerations, the projection can be chosen "in the upward direction" and "in the downward direction". The projection "in the upward direction" has proven to be particularly advantageous (see the reasons given elsewhere).

The combinations and embodiments presented above can also be considered in numerous further connections and combinations.

For instance, it is possible to design the input shaft(s) and/or the output shaft(s) as shafts which are likewise borne on sleeve-like hollow bodies, for example.

By way of example, consideration can also be given to using more than four bearings, in particular more than two bearing combinations, to attach the input shaft to the case, more precisely the case pans.

In addition, it is possible to provide one or more further stages in the transmission, so that individual gears or the stages are placed on the opposite leg or the adjacent leg.

By projection of gear positions or gear situations of a gear or even of multiple gears assigned to one or more stage(s) of the transmission, in particular in a traction mode, wherein the electric drive motors may be positioned behind the vehicle axle, the possibility is provided of keeping axial and transverse forces in the transmission at least very low, in particular on middle gears (of the chains of gears) or in its middle gears.

Of course, it is also possible to equip only a relatively short portion in the transmission case with a vent that opens into a breather cap.

The vent may be composed of a certain number of individual portions; for instance, the vent may comprise just one portion, two portions, three portions, four portions, or even more than five portions.

At least one of the portions can be used to discharge transmission fluid, such as oil, that enters said portion, including via bearings, for example in the course of lubrication thereof. For instance, it is possible to use oil to lubricate bearings of gears that rotate about the axle used as a vent structure.

The aforementioned vent can easily be produced and is nevertheless a reliable vent for transmissions because, for example, the selected location is a stationary center in the rotation center of gears of a gear stage.

The aforementioned vent can be used with particular advantage in twin transmissions, which are preferably equipped with one overall oil space (chamber) but can actually be regarded as two independent transmissions.

BRIEF DESCRIPTION OF THE FIGURES

The present invention can be understood even better if reference is made to the accompanying figures which show particularly advantageous design possibilities by way of example, without limiting the present invention thereto, wherein.

DESCRIPTION OF THE FIGURES

Figure 1:
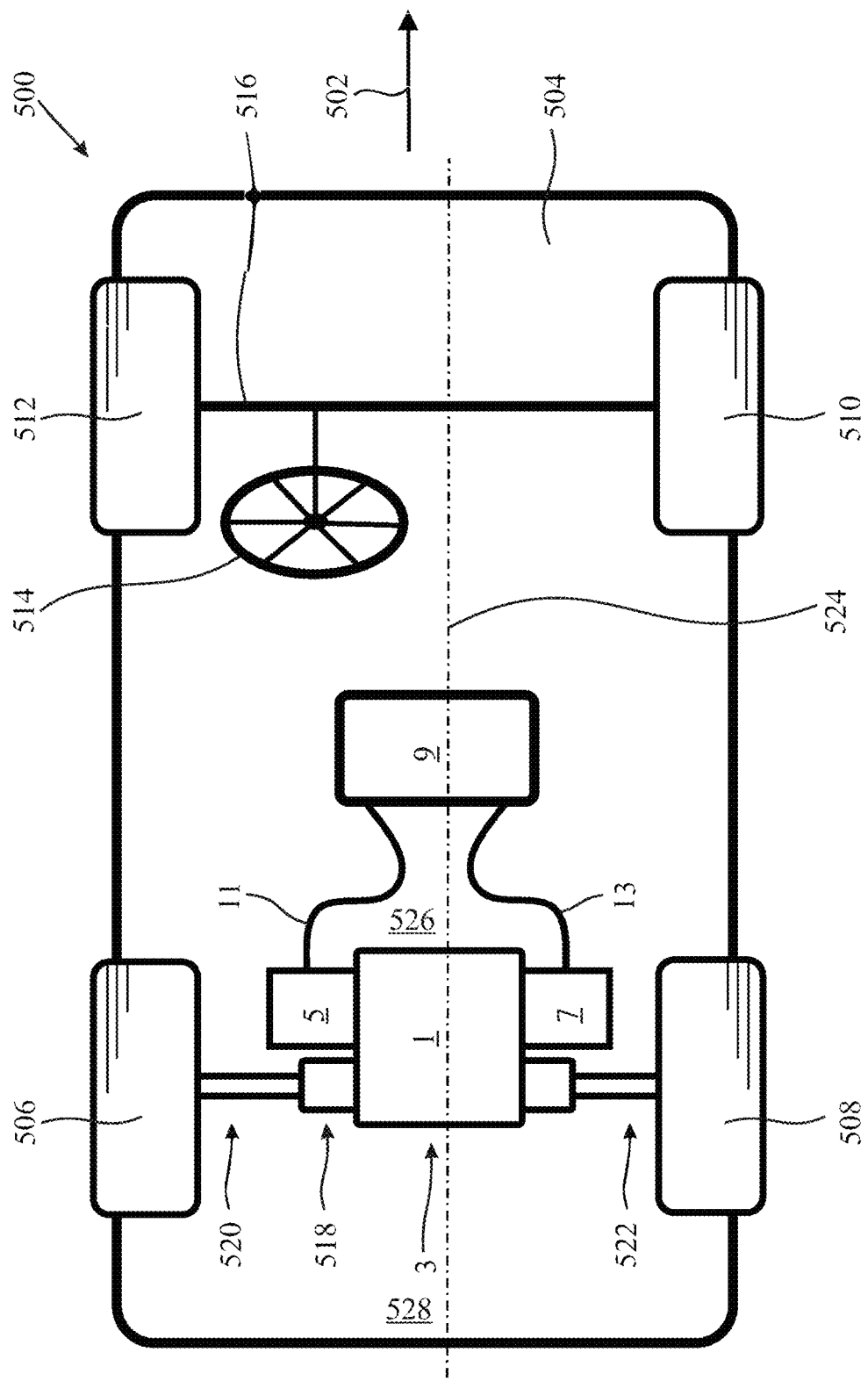
FIG. 1 shows a vehicle system in a schematic illustration.
Figure 2:
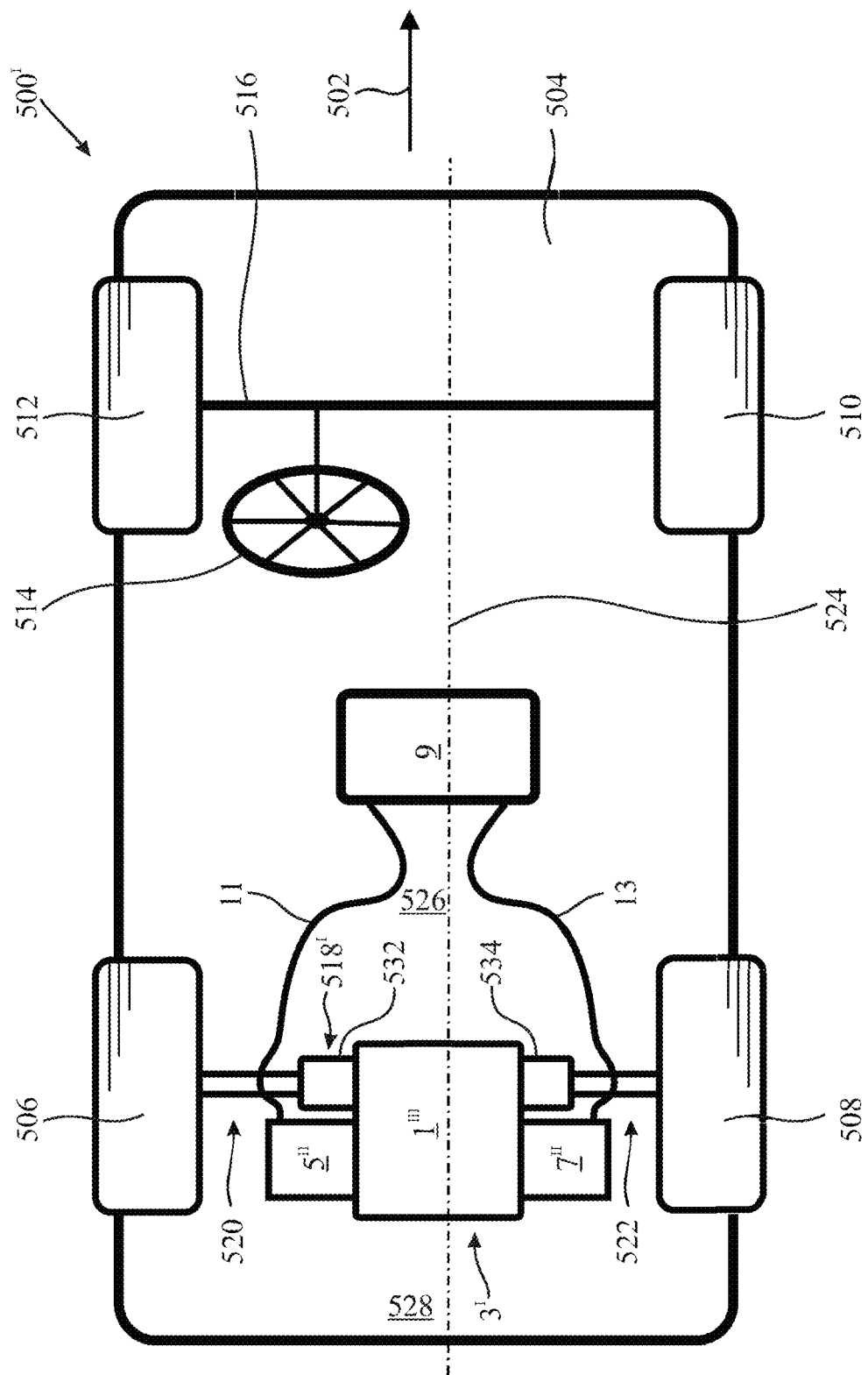
FIG. 2 shows another example of a vehicle system in a schematic illustration.

FIG. 1 and FIG. 2 schematically show a motor vehicle 500 or 500′ which, in addition to the space for the driver, which is identifiable by the steering wheel 514 and can also be referred to as the drivers cab or passenger compartment, has a rear 526 and a trunk region 528, identifiable by the marked direction of travel 502. Located in the front part of the passenger compartment, as usual, is the steering wheel 514, which can transmit a driver's steering movements to two wheels as road wheels 510, 512 via a steering linkage 516 consisting of a steering shaft, a steering transmission, track rods and wheel steering levers. Two further road wheels 506, 508 are mounted on a second axle, the vehicle rear axle 518. A wheel or road wheel can also be referred to as a vehicle wheel because it serves to move the motor vehicle 500 or 500$^I$. The road wheels 506, 508 are driven via half-axles 520, 522, the universal (joint) drive shafts. The half-axles 520, 522 are attached to the output side of a dual transmission 1 or 1$^{III}$. A first electric machine 5 or 5$^{II}$ and a second electric machine 7 or 7$^{II}$ are attached to the drive side of the dual transmission 1 or 1$^{III}$. The electric machines 5, 7 or 5$^{II}$, 7$^{II}$ and the half-axles 520, 522 are each attached in pairs to opposite sides of the transmission 1 or 1$^{III}$. Torque from the electric machine 5 or 5$^{II}$ is applied to an input shaft 33 (see FIG. 3) of the dual transmission 1 or 1$^{III}$ via a respective side, and the first half-axle 520, and thus the output to the first road wheel 506, is attached on the same side of the dual transmission 1 or 1$^{III}$. In the same way, torque from the electric machine 7 or 7$^{II}$ is applied to an input shaft 35 (see FIG. 3) of the dual transmission 1 or 1$^{III}$, and the second half-axle 522, and thus the output to the second road wheel 508, is arranged on the same side of the dual transmission 1 or 1$^{III}$.

A particularly advantageous motor vehicle body exists if the electric machines 5, 7, which in FIG. 1 are mounted in front of the half-axles 520, 522 in the direction of travel 502, are mounted behind the half-axles 520, 522 as shown on the basis of the electric machines 5$^{II}$, 7$^{II}$ in FIG. 2, for example in that the symmetrically constructed dual transmission 1 is rotated through 180° in the illustrated plane of the vehicle floor 504 of FIG. 1 and in particular mounting points for the dual transmission 1 and the electric machines 5, 7 are provided underneath the trunk 528. As shown in FIG. 2, however, a powertrain 3$^I$ comprising a dual transmission 1$^{III}$ can also be constructed in a motor vehicle 500$^I$, the gears (see FIG. 3) of said transmission being designed to transmit power in an arrangement of the electric machines 5$^{II}$, 7$^{II}$ behind a rear axle 518$^I$.

According to FIG. 1 and according to FIG. 2, an electric accumulator 9 is located in the region of the vehicle floor 504, which accumulator, via electrical leads 11, 13, can provide electrical energy to the electric machines 5, 7 or 5$^{II}$, 7$^{II}$ and the motor controls thereof (not shown). The powertrain 3 or 3$^I$ thus extends from the accumulator 9, via the electrical leads 11, 13, via the electric machines 5, 7 or 5$^{II}$, 7$^{II}$ and the motor controls thereof, via the dual transmission 1 or 1$^{III}$, and via the half-axles 520, 522, to the road wheels 506, 508. One electric machine 5, 7 or 5$^{II}$, 7$^{II}$ thus drives one road wheel 506, 508. This is a single-wheel drive.

The transmission 1 or 1$^{III}$ is arranged on the vehicle longitudinal axis 524. One electric machine 5 or 5$^{II}$ and one half-axle 520 are located on one side of the vehicle longitudinal axis 524, while the other electric machine 7 and the other half-axle 522 are arranged on the other side of the longitudinal axis 524. The electric machine 5 or 7, which according to FIG. 1 is arranged close to the center and rotates transversely to the vehicle longitudinal axis 524, rotates the transmission 1 so that, on the output side, an output shaft 37, 39 (see FIG. 3) can apply a torque to a wheel 506 or 508 likewise transversely to the vehicle longitudinal axis 524. The electric machine 5$^{II}$ or 7$^{II}$, which according to FIG. 2 is arranged close to the trunk and rotates transversely to the vehicle longitudinal axis 524, rotates the transmission 1$^{III}$ so that, on the output side, an output shaft 37, 39 (see FIG. 3) can apply a torque to a wheel 506 or 508 likewise transversely to the vehicle longitudinal axis 524. As shown in FIG. 1 or FIG. 2, for such a drive connection, the electric machine 5, 7 or 5$^{II}$, 7$^{II}$ is attached to the input shaft 33, 35 (shown in FIG. 3) by a coupling 532, 534. The transmission 1 or 1$^{III}$ and the electric machines 5, 7 or 5$^{II}$, 7$^{II}$ are coupled.

The vehicle 500 or 500$^I$ shown in FIG. 1 or FIG. 2 is driven via its vehicle rear axle 518 or 518$^I$. This is an electric rear axle drive using the dual transmission 1 or 1$^{III}$. The dual transmission 1 or 1$^{III}$ is arranged in the region of the rear compartment 526 or in the region of the trunk 528, and in each case in the region of the vehicle floor 504.

Figure 3:
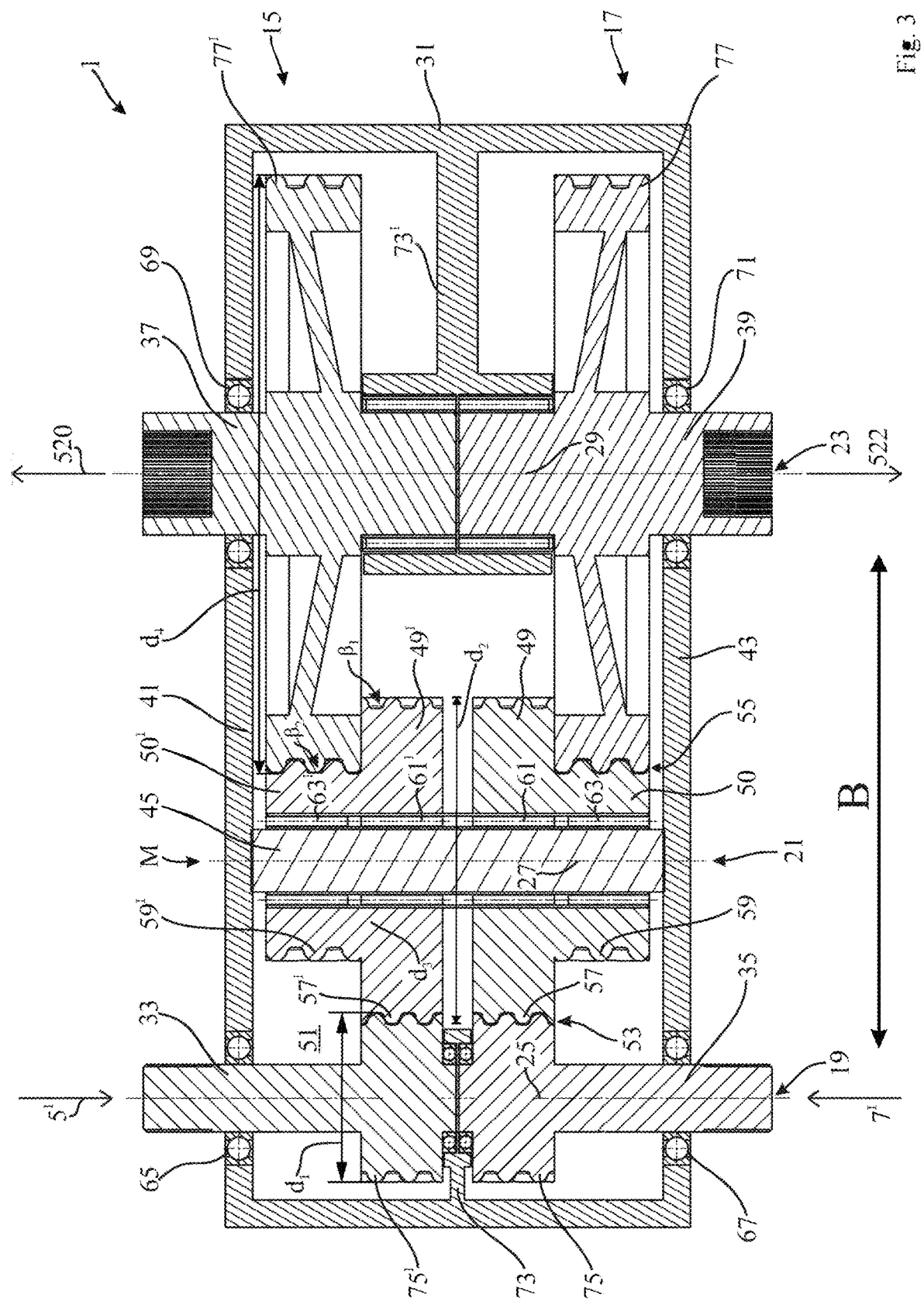
FIG. 3 shows a schematically illustrated transmission in a longitudinal section.
Figure 4:
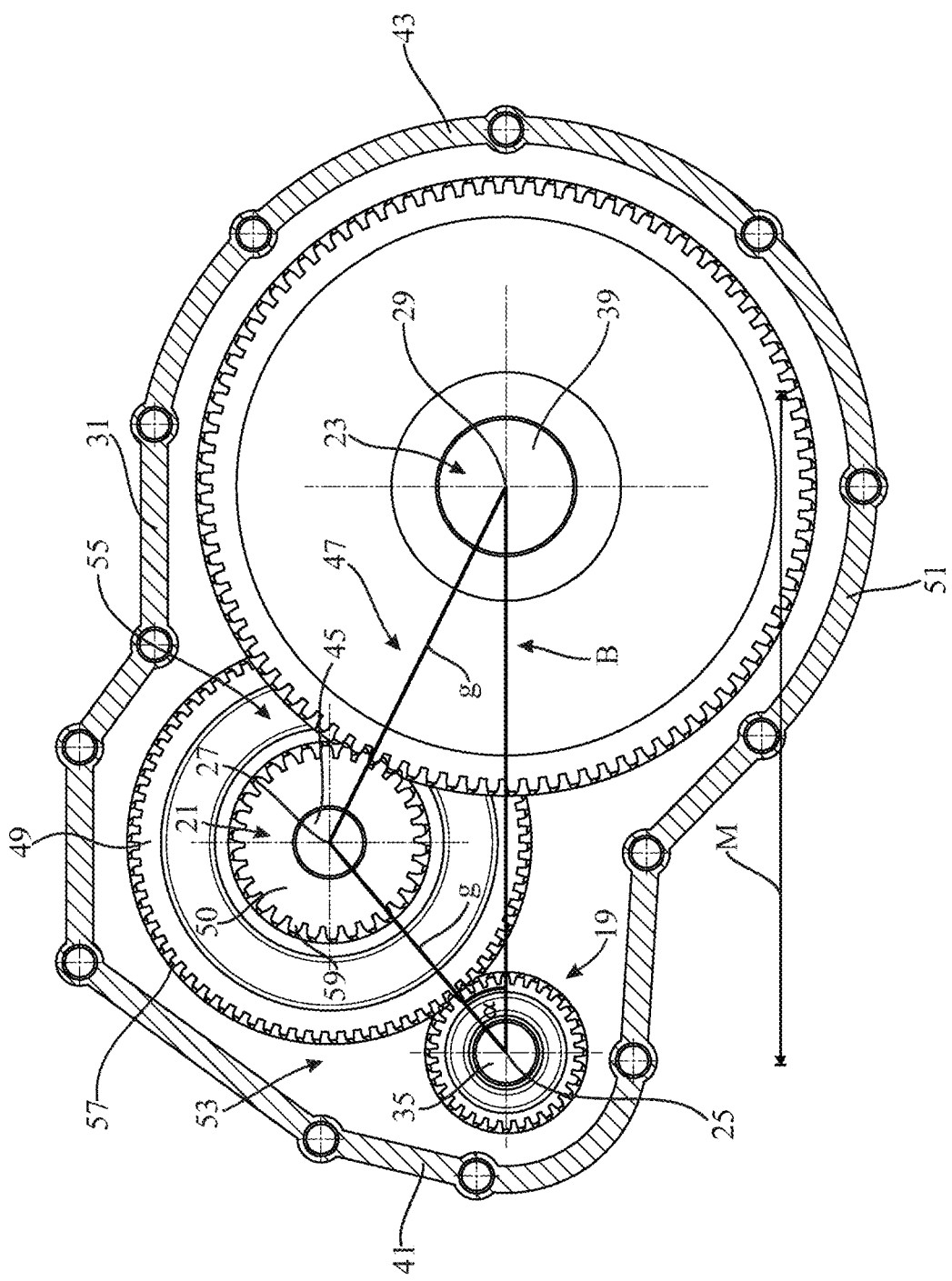
FIG. 4 shows a schematically illustrated transmission in an open side view.

It is particularly advantageous if FIGS. 3 and 4 are considered jointly.

Figure 5:
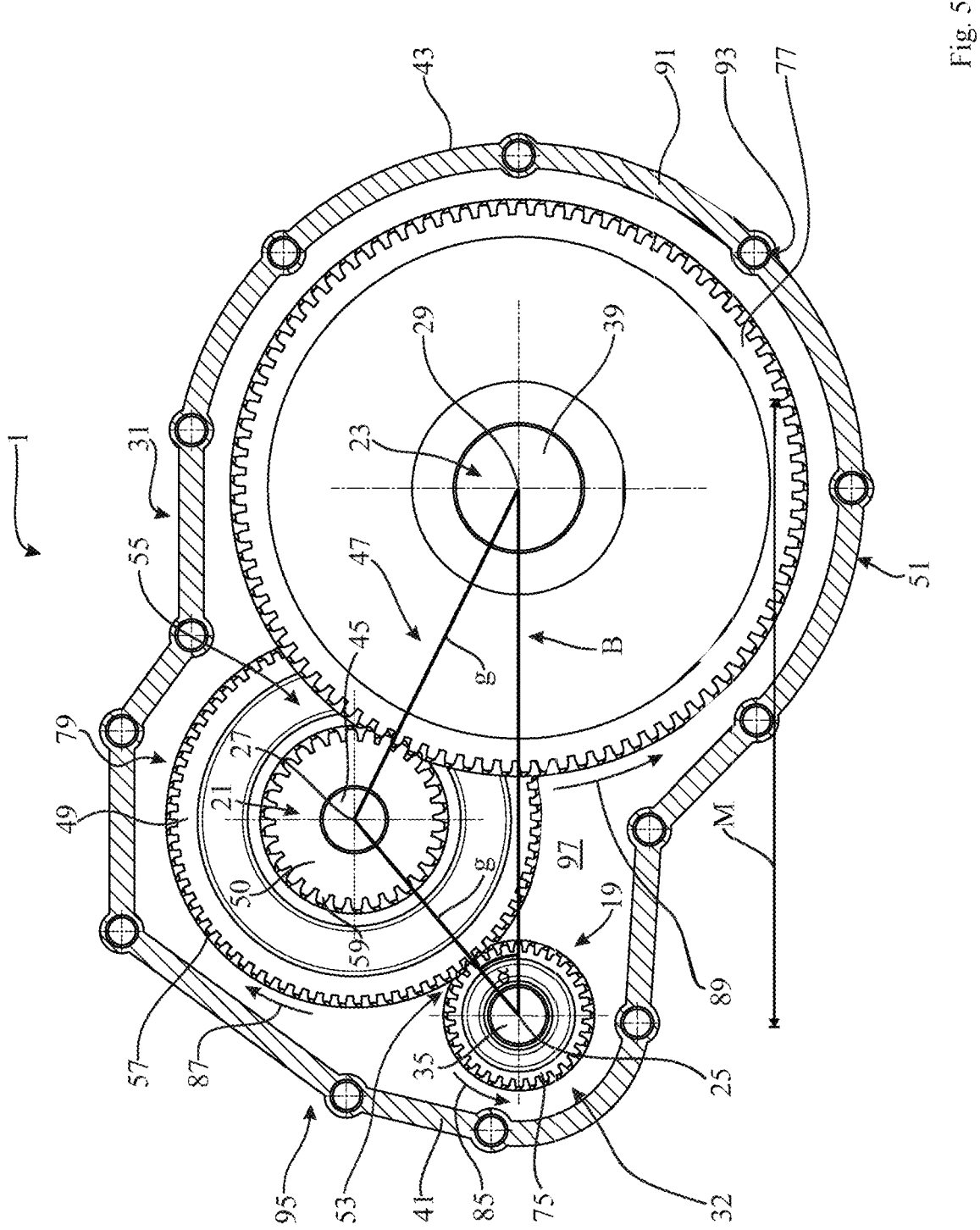
FIG. 5 shows a schematically illustrated transmission according to FIG. 4 in a state of rotation.

An advantageous exemplary embodiment will be explained below primarily on the basis of FIG. 3. FIG. 4 and FIG. 5 are to be included in addition to what is stated below.

Figure 6:
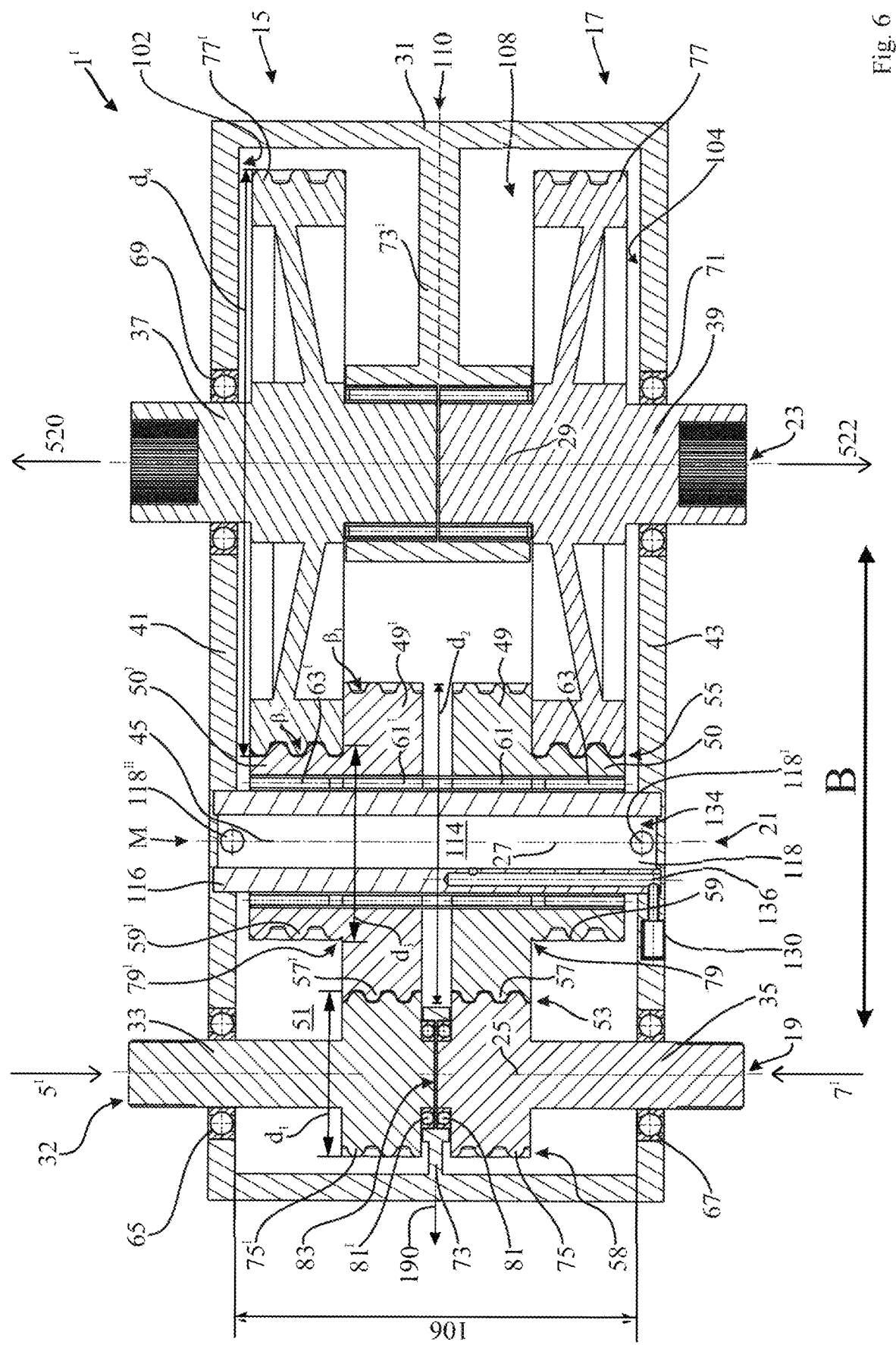
FIG. 6 shows a schematic illustration of another example of a transmission in a longitudinal section.

The transmission 1 is shown in a sectional view in FIG. 3, and the transmission 1$^I$ is shown in a sectional view in FIG. 6, the section being made in each case through the individual gear centers 25, 27, 29. When describing FIG. 6, particular emphasis will be placed on the differences compared to FIG. 3. For reference signs used jointly in FIG. 3 and FIG. 6, reference can be made to the description of FIG. 3 when considering FIG. 6. The transmission 1$^{III}$ of FIG. 2 can be designed in the manner of a transmission 1 according to FIG. 3 or in the manner of a transmission 1$^I$ according to FIG. 6 or in the manner of a transmission 1$^{II}$ according to FIG. 8, the transmission case in each case having attachment points for mounting it in the vicinity of the trunk (not shown).

As FIG. 3 and FIG. 6 show, the dual transmission 1 or 1$^I$ has two single transmissions 15, 17, each single transmission 15, 17 being formed as a two-stage spur gear transmission. Each spur gear transmission has three positions 19, 21, 23 for gear centers 25, 27, 29 in a single, common transmission case 31. The drive torque 5$^I$, 7$^I$ is applied by the electric machines 5, 7 (see FIG. 1) to the respective input shaft 33, 35. The input shafts 33, 35 connected to the respective electric machines 5 and 7 (see FIG. 1) and the output shafts 37 and 39 connected to the respective half-axles 520 and 522 are arranged at the same height in a middle region M in relation to a transverse extension, i.e. in particular a relatively short distance from one case wall 41 to an opposite case wall 43 of the transmission case 31. The position of the input shafts 33, 35 and of the output shafts 37, 39, which define the gear centers 25 and 29, describes a reference plane B within the transmission case 31. A middle axle 45, which describes a middle gear center 27 or middle position of an axially mounted gear 49, 49$^I$, 50, 50$^I$, is in a parallel and elevated position relative the reference plane B and forms a position of the gear center 27 at a distance from the transmission case bottom.

The two input shafts 33, 35 are combined to form a dual input shaft 32. They are mechanically connected to form the dual input shaft 32. The two input shafts 33, 35 extend along the axis 44 and in this way form the dual input shaft 32. The two coaxially arranged input shafts 33, 35 are connected to each other in such a way as to be rotatable relative to each other.

As can be seen even better on the basis of FIG. 4 and FIG. 5, the middle axle 45 is located at a corner of a triangle 47 spanned by the gear centers 25, 27 and 29.

The middle axle 45 can be intersected by a straight line g connecting the gear center 25 or 29 and the middle axle 45, namely in an angle range of around 5° to 70°.

As can be seen particularly well in FIG. 4, it may be advantageous to locate the gear centers 25, 27, 29 on two planes so that a straight line g extending from one plane to the next is at an angle α to one of the two planes, namely the plane B, the angle being taken from an angle range of 10° to 50° or even only an angle range of 15° to 48°.

As can likewise be seen from FIG. 3 or FIG. 6, the way in which the gear centers 25, 27, 29 are to be located depends on the on the gears 75, 75$^I$ of the input shafts 33, 35, the gears 77, 77$^I$ of the output shafts 37, 39 and the gears 49, 49$^I$, 50, 50$^I$ of the toothing geometries selected on the middle axle 45, as well as on the powers to be transmitted. The gears 75, 75$^I$ on the input side have a diameter $d_1$ that is smaller than a diameter $d_4$ of the gears 77, 77$^I$ on the output side of the dual transmission 1. On account of being driven by the drive torques 5$^I$, 7$^I$, the gears 75, 75$^I$ are the first gears in the flow of torque through the transmission 1.

The respective gear 75, 75$^I$ on the input shaft side of each single transmission 15, 17 drives a respective gear 49, 49$^I$ on the middle axle 45, wherein, in the exemplary embodiments shown, the directions of rotation of the electric machines 5, 7 (see FIG. 1) in the traction mode of the vehicle are selected in such a way that the gear 49, 49$^I$ has a direction of rotation rotating away from the case bottom 51 of the transmission case 31 following gear contact in a driving manner.

The direction of rotation arrow in FIG. 5 illustrates this specification of the directions of and the direction of rotation. The dual transmission can also be operated in the reverse direction of the direction of rotation arrows, particularly for driving in reverse.

If, in a manner differing from the advantageous motor vehicle body shown in FIG. 1 and described in this connection, a motor vehicle body is realized with a transmission arrangement as in FIG. 2, in which the transmission arrangement is turned through 180° in comparison to the transmission arrangement in FIG. 1, then a direction of rotation rotating toward the case bottom 51 of the transmission case would likewise be set for the gear 49, 49$^I$ following gear contact, but the direction of rotation of the electric machines must be adapted to the installation position.

As illustrated in particular in FIG. 3 or FIG. 6, the axle 45 defining the middle position or the middle gear center 27 is designed as a stationary axle that is fixed to the case. This makes it possible to stiffen the transmission case 31 without the need for additional components. The respective driven gear 49, 49$^I$ on the axle 45 and the driving gear 50, 50$^I$ are borne on the axle 45 via in each case two needle bearings 61, 63, 61$^I$, 63$^I$ in order to avoid any tilting of the gears 49, 50 or 49$^I$, 50$^I$, which are moreover preferably formed in pairs as a one-piece stepped gear.

In contrast, the input shafts 33, 35 and the output shafts 37, 39 are mounted by way of rolling bearings 65, 67, 69 and 71 in outer walls of the transmission case 31. Furthermore, the input shafts 33, 35 are mounted by means of ball bearings, or a separate ball bearing per single transmission 15, 17, in the vicinity of a case partition wall 73 that has apertures for the joint lubrication of the single transmissions 15 and 17. The output shafts 37 and 39 are mounted in a second case partition wall 73$^I$, more precisely a spectacles-type bearing bracket, by means of needle bearings (without reference signs) or one needle bearing per single transmission 15, 17.

As can be seen particularly well from looking at FIG. 4 and FIG. 5, the input shafts 33, 35 and the output shafts 37, 39 are arranged lower than the axle 45 in relation to the case bottom 51 of the transmission case 31.

The stepped gears 79, 79$^I$ (see FIG. 6) on the axle 45 have a first, larger diameter $d_2$ on the drive side and a smaller, second diameter $d_3$ on the output side (see FIG. 3). There is a step-down ratio toward the output side. It can also be said that the two gears 49, 50 or 49$^I$, 50$^I$ are joined together or welded together to form a stepped gear 79 or 79$^I$.

If FIG. 3 and FIG. 6 and respectively FIG. 4 and FIG. 5 are considered simultaneously, it can be seen that the larger diameter $d_2$ is located toward the inside, while the smaller diameter $d_3$ (in comparison thereto) is located closer to the case 31. It is thus possible to direct the torques introduced into the transmission 1 toward the output shaft 37, 39 in an outward direction. Owing to the planes of the transmission 1, in which the gear centers 25, 27, 29 are located, and owing to the arrangement of the stages 53, 55, the torques follow a course in the shape of a double V (on the one hand with regard to heights in relation to a base, in particular the case bottom 51, of the transmission 1, and on the other with regard to a divergence away from a vehicle longitudinal axis 524 (see FIG. 1)).

As shown in FIG. 5, about the gear center 25, the gear 75 of the input shaft 35 has a first direction of rotation 85 that is directed toward the case bottom 51. About the second gear center 27, the larger gear 49 of the stepped gear 79, which is driven by the input shaft 35, has a second direction of rotation 87 that on the drive side is directed away from the case bottom 51. The driven gear 77 is rotated about the third gear center 29, said driven gear meshing with the smaller gear 50 of the stepped gear 79 and being driven thereby in a third direction of rotation 89 towards the case bottom 51. Owing to a spacing of the second gear center 27 from the reference plane "B", the first gear center 27 and the third gear center 29 are closer to each other than in the case of a linear arrangement of three gear centers, the gears of which have the same dimensions as the gears 75, 77, 79. The transmission case 31 is thus shortened in a direction of the base of the triangle 47, which lies in the reference plane "B". In other words, as shown in FIG. 5, the transmission 1 is particularly compact and efficient in terms of installation space.

In FIG. 5, the case 31 is shown schematically in an open state on the basis of the first sub-case 95. The first sub-case 95 can be connected to a shell-like second sub-case (not shown) at a flat sealing surface 91. The connection of the identically curved sub-case, such as the sub-case 95, takes place by means of bolts, which can be screwed into bolt threads 93 of the first sub-case 95. The sealing surface 91 extends parallel to the triangular area spanned by the positions 19, 21, 23. In other words, the sealing surface lies in a plane parallel to the gears 75, 77, 79. It can also be said that the input shaft 35 is arranged perpendicular to the sealing surface 91 or perpendicular to the sub-case connection surface 91 in the transmission case 31. This facilitates assembly of the transmission 1.

In an installed state of the transmission case in a motor vehicle (see motor vehicle 500 or 500$^I$ in FIG. 1 or FIG. 2), the case longitudinal direction 190 shown in FIG. 6 is oriented parallel to the vehicle longitudinal axis (see vehicle longitudinal axis 524 in FIG. 1 or FIG. 2). The transmission case 31 has a larger extension in its case longitudinal direction 190 than in its width 106.

In the dual transmission 1 according to the invention, a first gear stage 53 or first ratio 53 is created, which forms a ratio turning away from the case bottom 51 of the transmission case 31, as well as a second gear stage 55 or the second ratio 55, which forms a ratio turning toward the case bottom 51. On the other hand, the gear pairing consisting of the first two gears 75$^I$, 49$^I$ in the flow of torque in the transmission 1 creates the ratio 53$^I$. The gear pairing consisting of the subsequent two gears 50$^I$, 77$^I$ creates the ratio 55$^I$.

As shown in particular by FIG. 3 or FIG. 6 in a schematic longitudinal section through the dual transmission 1 or $1^I$, the middle gears 49, 50 or $49^I$, $50^I$, which are formed in one piece with each other, are designed to transmit a torque in a manner free of transverse forces due to the fact that the teeth 57 and 59 or $57^I$ and $59^I$ of two adjacent gears 49, 50 or $49^I$, $50^I$ have different angles of inclination for each row of teeth, such as the angles of inclination $\beta_1$ and $\beta_2$. To aid comprehension, the angles of inclination $\beta_1$, $\beta_2$ are indicated only schematically in the illustrated section plane of FIG. 3 or FIG. 6. The teeth 57, 59 of the sub-transmission 17 as well as adjacent teeth of the respective rows of teeth (without reference signs) extend with respective tooth directions in a parallel manner through the section plane of FIG. 3 or FIG. 6. In relation to a specified or selected direction of the middle axle 45, the teeth 57, 59 or the running surfaces thereof extend with a tooth direction laterally toward the other sub-transmission 15 or away from the other sub-transmission 15, wherein a deviation, expressible by vectors, of the tooth directions of the teeth 57, 59 from the direction of the middle axle 45 in each case has the same sign for their vector values (identical sign in the angles of inclination).

The gears 49, 50 or $49^I$, $50^I$ are free of axial forces, at least in the traction mode of the vehicle.

For the gears $49^I$, $50^I$ and the teeth $57^I$, $59^I$ of the other single transmission 15, the same applies on account of an identical design of transmission parts, i.e. the sub-transmission 15, which is constructed in a manner identical to the sub-transmission 17, has adjacent gears $49^I$, $50^I$ which are designed with a corresponding inclination of the teeth $57^I$, $59^I$. In other words, what has been described above correspondingly applies to the gears $49^I$, $50^I$ and the teeth $57^I$, $59^I$ of the other single transmission 15 due to an identical design of transmission parts.

It may be advantageous to provide thrust washers to support the gears 49, 50 or $49^I$, $50^I$ on the transmission case 31.

Furthermore, in order to vent the transmission case 31, it may be advantageous to provide a sleeve instead of the middle axle 45 or additionally on the middle axle 45, which sleeve makes it possible to equalize the pressure in the transmission case 31.

The gears 49, $49^I$, 50, $50^I$, 75, $75^I$, 77 and $77^I$ are formed as disk wheels on account of the high torques to be transmitted. As shown in FIG. 3 or FIG. 6, the gears 77 on the output shaft side are formed by a disk that has a thickness smaller than the width of their gear rim. In addition, the respective disk of the gears 77, $77^I$ is at an angle to the respective output shaft 37, 39. In other words, it may be formed at a non-perpendicular angle to the respective output shaft 37, 39. The disk has a base with an end face that extends radially from the output shaft 37, 39 or merges into the output shaft 37, 39 and in particular bounds a running surface of a needle bearing in an axial direction.

All the gears, axles and shafts installed in the transmission case 31 are lubricated via a common sump. Each single transmission 15, 17 has a step-down ratio of, for example, 8.5:1 or even 12:1.

As can be seen from FIG. 4, the positions 19, 21, 23 of the gear centers 25, 27, 29 are located in a middle region M within the case walls 41, 43. As a stepped gear, the gear 49 with its teeth, such as the tooth 57, and the gear 50 with its teeth, such as the tooth 59, is the gear arranged furthest from the case bottom 51 in the upward direction. In traction mode, such a stepped gear, as formed from the gears 49, 50, is driven by an input shaft 35, which is part of the dual input shaft 32 (see FIG. 3).

It can be seen particularly well in FIG. 6 that, between the input shafts 33, 35, in the region of the gears 75, $75^I$ thereof, an air gap 83 separates the (sub-)input shafts 33, 35 and thus the gears 75, $75^I$. Each gear 75, $75^I$ is designed as a gear rim 58 formed in one piece with the dual input shaft 32. The gear rim 58 is part of the input shaft 35. The input shafts 33, 35 are separated from each other by an air gap 83 in the region of their gears 75, $75^I$. Arranged adjacent to the gears 75, $75^I$ are ball bearings 81, $81^I$, via which the dual input shaft 32 is supported against the case 31, in particular via the bearing-carrying case partition wall 73.

As shown in particular in FIG. 5, each sub-transmission 15, 17 extends in its own sub-transmission chamber 97, which in each case is formed at least in parts by the transmission pan or case pan 95.

In a regular filling state, the transmission case 31 is filled with a transmission oil, but not completely filled with oil; instead, part of the interior, i.e. part of the internal volume 108 (see FIG. 6) of the transmission case 31 is filled with air.

By way of its internal cavity, the transmission $1^I$ shown in FIG. 6 with its transmission case 31 creates an internal volume 108 that extends from the first inner side 102 thereof to the second inner side 104 thereof. However, the volume-reducing components are arranged in the internal volume 108. The internal volume 108 is partly reduced by the gears, such as the gears 49, $49^I$, 50, $50^I$, 75, $75^I$, 77, $77^I$, by shafts, such as the shafts 33, 35, 37, 39, and by other components, such as needle bearings 61, $61^I$, 63, $63^I$ and rolling bearings, as well as by a sleeve 116. The free internal volume 108 is reduced by the installed components. The remaining internal volume 108 is filled to a certain level with a transmission fluid, such as a transmission oil, for operating the transmission $1^I$. Air remains in the rest of the internal volume 108.

For air that is to pass outward via a bore 118 in a sleeve 116 to a breather cap 130 in order to be discharged, a vent structure is incorporated in the transmission $1^I$.

The sleeve 116, which is hollow due to a bore 118, is located in the region of the gear axle 114 among the gear pairs 49, 50 or $49^I$, $50^I$ designed as stepped gears 79 or $79^I$. The cavity created by the bore 118 in the interior of the sleeve 116 has connections to the rest of the internal volume 108 of the transmission $1^I$ or of the transmission case 31 via further bores $118^I$, $118^{II}$. The further bores $118^I$, $118^{II}$ extend transversely, in particular orthogonally, to the bore 118.

The sleeve 116 extends from one inner side 102 to the opposite inner side 104 of the transmission case 31. The sleeve 116 is a transverse strut that stiffens the case 31. An (internal) width 106 of the transmission case 31 is completely spanned by the sleeve 116. The sleeve 116 therefore extends from a first case wall 41 to a second case wall 43.

Advantageously, the sleeve 116 is located in a middle region M of the transmission $1^I$. The middle region M of the transmission $1^I$ is used by the second, middle position 21 to center gears 49, $49^I$, 50, $50^I$.

Via the (feed) bores $118^I$, $118^{II}$, air from the internal volume 108, namely from anywhere therein so long as it is somehow distributed over the width 106, can enter the centrally arranged bore 118 of the sleeve 116, which in particular spans the width 106 of the case 31. The air then passes to the breather cap 130. The case wall 41, 43 may contain further bores (not shown), which extend partially along the case wall 41, 43 and via which air enters the bore 118 that spans the width 106 of the case 31. Such bores in the case wall also serve to supply oil to the needle bearings of the gears 49, $49^I$, 50, $50^I$.

Figure 7:
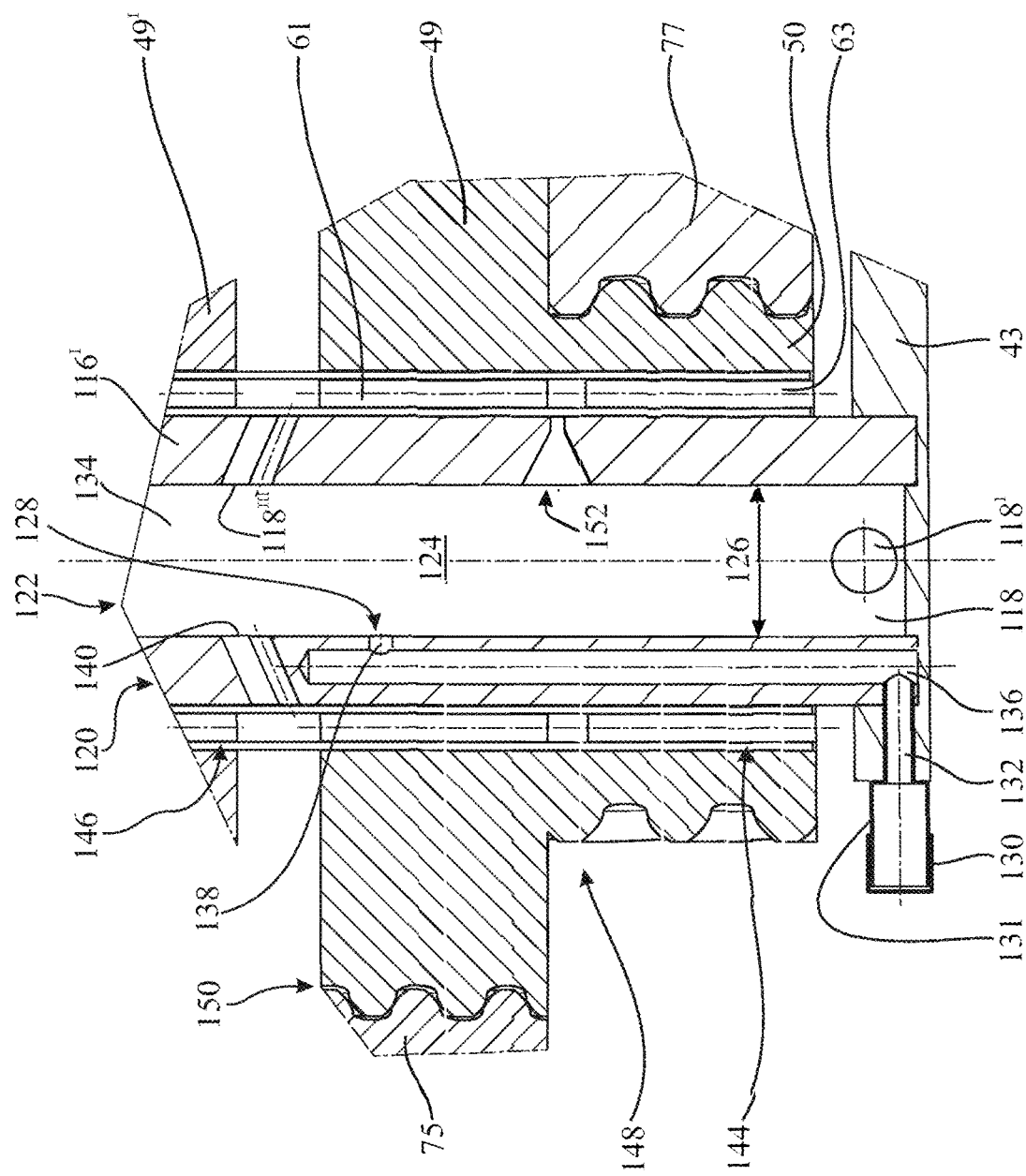
FIG. 7 shows an isolated detail from the transmission of FIG. 6 with an alternative embodiment of a stiffening pipe used for venting.

As can be seen from a joint consideration of FIGS. 6 and 7, a narrower portion 136 is connected to the thicker portion 134 outside of a center 110 of the transmission 1$^I$. The narrower portion 136 of the vent extends over less than half the distance of the sleeve 116.

FIG. 7 shows an enlarged view of a detail from a sleeve 116$^I$ that is designed in an alternative manner compared to the sleeve 116 of FIG. 6, together with a detail from the case wall 43 and the gears 49, 49$^I$, 50, 75, 77, which are also shown in FIG. 6. The needle bearings 61, 63 are also visible below the gears 49, 50.

The sleeve 116$^I$ shown in FIG. 7 offers more functions than the sleeve 116 according to FIG. 6. In terms of dimensions, however, the sleeves 116, 116$^I$ are identical.

For exchange with the surrounding environment, the vent according to FIG. 7 provides a breather cap 130, which is connected to the breather tube 132, plugged onto a nozzle 131. The nozzle 131 is connected to the breather tube 132 in the form of an extension that enlarges a flow cross-section. A venting point, in particular at a distance from a surface of the transmission (see transmission 1$^I$ in FIG. 6), can be defined by means of a nozzle length, a nozzle curvature or a nozzle outlet angle. The vent channel 124 has multiple portions 134, 136. The portions 134, 136 can also be referred to as vent channel segments. The vent channel 124 is divided into multiple portions 134, 136, some of which extend parallel to each other and some of which extend perpendicular to another portion. The portions 134, 136 have different diameters. This creates possible ways of influencing the flow behavior of the air in a transmission, such as the transmission 1$^I$ (see FIG. 6). The vent channel 124 has a portion 134 that is deemed to be the actual vent channel 124 owing to the fact that it has a diameter 126 that is larger than the other portions, such as the portion 136.

The enlarged detail of one end of the sleeve 116$^I$, which is shown in FIG. 7, shows the vent structure inserted in the case wall 43, said vent structure including the breather tube 132 with the breather cap 130 as well as the multi-deflected channel routing with its portions 134, 136 and its transition regions, such as the transition region 138. The thickest portion 134 is the vent channel 124 that has the largest cross-section 126. Bores 118$^I$, 118$^{III}$ and lubrication passages, such as the lubrication passage 152, branch off from the vent channel 124. Advantageously, the vent channel 124 itself is a bore 118. In simplified terms, this can be referred to as the bore 118 when denoting elongate channels of uniform cross-section 126 that extend in particular over the width 106 of the case (see FIG. 6), such as the vent channel 124. In its central region, therefore, the sleeve 116$^I$ provides a space 122 that may optionally contain an air-oil mixture, for example in the form of an aerosol. By means of transverse bores, such as the transverse bore 140, and lubrication passages, such as the lubrication passage 152, the oil or the oil-air mixture or the oil-air mist can be used to lubricate the bearings 144, 146. Such bearings may be designed as needle bearings 61, 63. The sleeve 116$^I$ thus serves not only to provide the venting space 122, but also as a bearing 144, 146 for idler wheels, such as the idler wheel 148. The gears 49, 49$^I$, 50, which rotate about the sleeve 116 and mesh with other gears, in particular the gears 75, 77, form spur gear ratio stages, such as the spur gear ratio stage 150.

The special deflections starting from a vent feed line 128, via which oil is held back by means of narrower portions, such as the portion 136, are integrated in the edge region 120 of the sleeve 116$^I$. In addition to the gears 49, 50, the sleeve 116$^I$ serves as a bearing for other gears, such as the gear 49$^I$.

Via transverse bores, such as the transverse bore 118$^I$, an oil-air mist can enter the channel 124, which forms part of the vent structure. The lubrication passages, such as the lubrication passage 152, are arranged in the sleeve 116$^I$ in order to route oil back to the bearings 144, 146. Air from the air-oil mixture can flow via the vent feed line 128 to the breather cap 130 in order to be discharged from the transmission, such as the transmission 1$^I$ according to FIG. 6 for example, to the surrounding environment when overpressure occurs, for example in relation to an ambient pressure of the surrounding environment. It is particularly advantageous that, by means of a flow deflection through the channels arranged at an angle to each other, such as the channels 134, 136, the flow is directed toward walls in order thus to improve an oil separation, so that air that is almost free of oil is discharged into the environment.

Figure 8:
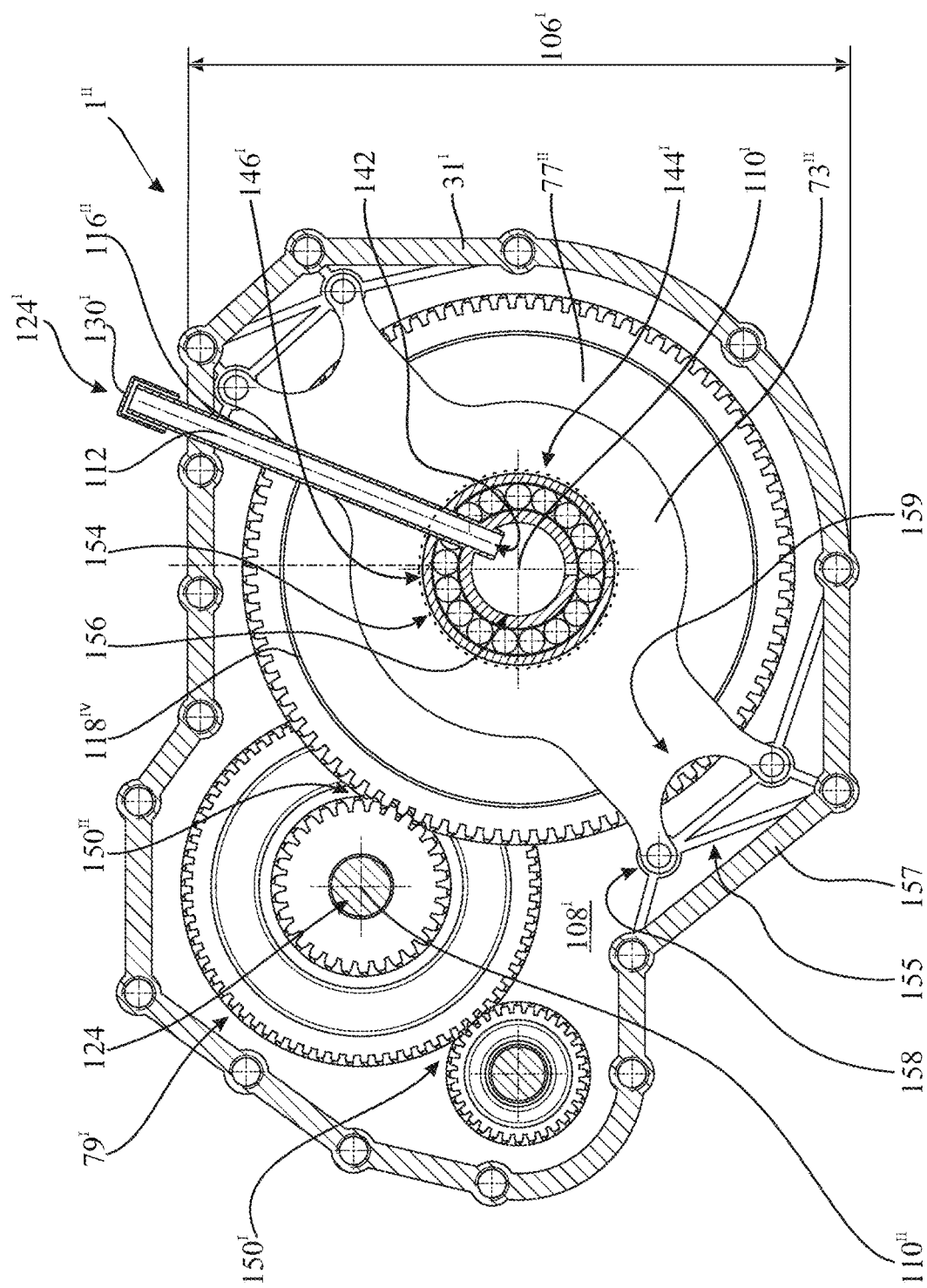
FIG. 8 shows a variant of an advantageous transmission with a vent, in a schematic illustration.

FIG. 8 shows another exemplary embodiment of a transmission 1$^{II}$ in a sectional view.

The transmission 1$^{II}$ according to FIG. 8 has a center 110$^I$. The spectacles-type bearing bracket 73$^{II}$ is arranged in the case 31$^I$ with its central hole structure 154 in the region of the center 110$^I$ of the transmission 1$^{II}$ or of the case 31$^I$. From the bearing 146$^I$ of the output gear 77$^{II}$, a sleeve 116$^{II}$ provided with a bore 118$^{IV}$ extends along a stationary axis 112, as a result of which air can be discharged via the breather element 130$^I$. The bore 118$^{IV}$ in the sleeve 116$^{II}$ forms the connecting channel or vent channel 124$^I$ from the center 110$^I$ or from an inner region of the central hole structure 154 of the spectacles-type bearing bracket 73$^{II}$ to the breather element 130$^I$.

The spectacles-type bearing bracket 73$^{II}$ has a single hole structure, namely the central hole structure 154, which serves to accommodate two bearings 144$^I$, 146$^I$. Of these two bearings 144$^I$, 146$^I$, only the bearing 146$^I$ arranged behind the vent channel 124$^I$ can be seen in the sectional illustration of FIG. 8. The other bearing 144$^I$, indicated in dashed line, would sit congruently in front of the illustrated bearing 146$^I$. In other words, the vent channel opens into an air space 156 between two bearings 144$^I$, 146$^I$ The air space 156 is annularly surrounded by the spectacles-type bearing bracket 73$^{II}$. The air space 156 is part of the internal volume 108$^I$ or belongs to the internal volume 108$^I$. A spectacles-type bearing bracket attachment 158 is surrounded by the internal volume 108$^I$ of the case 31$^I$, which can also be referred to as the transmission case 31$^I$. The spectacles-type bearing bracket attachment 158 is designed as a four-point attachment. In other embodiments, two-point attachments or three-point attachments or other torsion-proof attachments can be used. The spectacles-type bearing bracket attachment 158 comprises two spectacles-type bearing bracket forks, such as the spectacles-type bearing bracket fork 159, each of which, in the manner of a lever arm, directs tangential forces or transverse forces that may act on the bearings 144$^I$, 146$^I$ into the transmission case 31$^I$. Via the spectacles-type bearing bracket attachment 158, the spectacles-type bearing bracket is connected to a spectacles-type bearing bracket support structure 155 in the interior of the case 31$^I$. The two sub-cases of the case 31$^I$ can be connected to each other in a fluid-tight manner via a flat sub-case connection surface 157, for example with the interposition of a seal or a sealant (not shown).

With regard to the venting assemblies, therefore, FIG. 8 shows another variant of a transmission 1$^{II}$, this time with two vent channels 124, 124$^I$ that operate independently of each other. The transmission 1$^{II}$ has multiple spur gear ratio stages 150$^I$, 150$^{II}$. The transmission 1$^{II}$ has a stepped gear 79$^I$. The spur gear ratio stages 150$^I$, 150$^{II}$ are borne in different ways, for example by a spectacles-type bearing bracket 73$^{II}$. As a result, the transmission 1$^{II}$ provides multiple centers 110$^I$, 110$^{II}$ that can advantageously be used for venting via vent channels 124, 124$^I$. The channels 124, 124$^I$ are routed in sleeves, such as the sleeve 116$^{II}$ for example.

The sleeve 116$^{II}$ extends along the axis 112, which is arranged transversely to the axis of rotation of the gear 77$^{II}$. The gear 77$^{II}$ is rotatably mounted on the spectacles-type bearing bracket 73$^{II}$ via a bearing 146$^I$. There is additionally a further bearing 144$^I$, which is offset relative to the first-mentioned (more accurately the second) bearing 146$^I$. By means of a transverse bore 142 in the spectacles-type bearing bracket 73$^{II}$, a vent channel 124$^I$ is routed between the two bearings 144$^I$, 146$^I$ to the transmission case 31$^I$, more precisely out of the transmission case 31$^I$. The transmission case 31$^I$ has a width 106$^I$. Because the vent channel 124$^I$ starts only from the region of the bearings 144$^I$, 146$^I$ and extends as far as the case 31$^I$, the vent channel 124$^I$ is (only approximately) half as long as the width 106$^I$ of the transmission 1$^{II}$.

The vent channel 124$^I$ extends along the axis 112, which extends transversely to the axis of rotation. The vent channel 124$^I$ opens into the breather element 130$^I$. The breather element 130$^I$ is located outside the transmission case 31$^I$.

The vent channel 124$^I$ has been formed by a bore 118$^{IV}$ in the sleeve 116$^{II}$, said bore extending transversely to the axis of rotation.

The sleeve (without a reference sign) arranged for venting purposes between the spur gear ratios 150$^I$, 150$^{II}$ has an elongate vent hole, created by a bore (without a reference sign). The bore extends in the interior of the sleeve, see sleeve 116, bore 118 in FIG. 6).

As can be seen from FIG. 8, air in the interior of the transmission case 31$^I$ is routed via the bore 118$^{IV}$ to the breather element 130$^I$.

Figure 9:
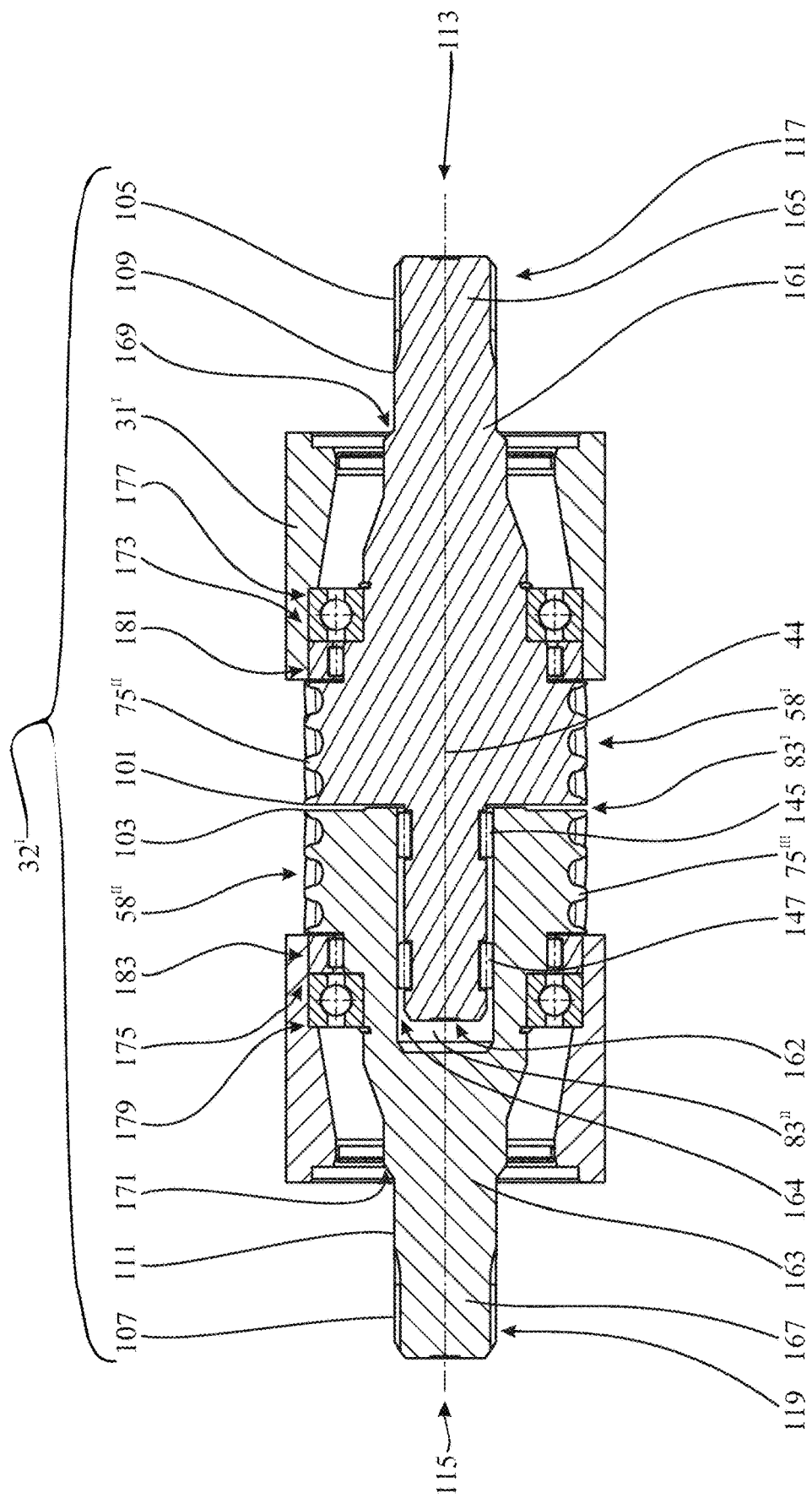
FIG. 9 shows a further development of a dual input shaft for a transmission, by which a transmission according to FIG. 3 or a transmission according to FIG. 6 can advantageously be further developed.

FIG. 9 shows a further development of a dual input shaft 32$^I$ which is advantageous for a dual transmission.

The dual input shaft 32$^I$ has two gears 75$^{II}$, 75$^{III}$ each of which is formed as a gear rim 58$^I$ or 58$^{II}$ between two ball bearings 177, 179. The two gears 75$^{II}$, 75$^{III}$ are located between the ball bearings 177, 179.

The dual input shaft 32$^I$ has two drive connections 117, 119. Each drive connection 117, 119 is provided on a stub 165, 167 of the dual input shaft 32$^I$, said dual input shaft being formed by stub shafts 161, 163. A drive connection 117, 119 serves to be surrounded by a connector (not shown) in such a way as to enable transmission of a rotational force. The drive connection 117, 119 comprises a splined shaft profile 105, 107 in a shaft casing 109, 111. The shaft casing 109, 111 starts at the end of a shaft end face 113, 115. Owing to the splined shaft profile 105, 107 in the shaft casing 109, 111, the stub shaft 161, 163 offers a good form-fitting and/or force-fitting connection to the electric machine 5, 7 or 5$^{II}$, 7$^{II}$ (see FIG. 1 or FIG. 2).

The two stub shafts 161, 163, which together are essential parts of the dual input shaft 32$^I$, are designed as stepped shafts 169, 171. The largest step in the stepped shaft 169, 171 is the step of the integrated gear rim 58$^I$ or 58$^{II}$. The gear rim 58$^I$, 58$^{II}$ is designed as a gear 75$^{II}$, 75$^{III}$ having a gear cheek 101, 103. Each gear cheek 101, 103 belongs to a separate gear 75$^{II}$, 75$^{III}$. An air gap 83$^I$ is located between the gear cheeks 101, 103, said air gap being defined by the spacing between the gears 75$^{II}$, 75$^{III}$. The air gap 83$^I$ enables the gear cheeks 101, 103 to rotate next to each other, particularly at different speeds, in an almost friction-free manner.

The stepped shafts 169, 171 each have a separate bearing pair 173, 175 to support them against the case 31$^I$, which is shown only schematically. Each bearing pair 173, 175 is composed of one deep groove ball bearing 177, 179 and one cylindrical roller bearing 181, 183.

The two stepped shafts 169, 171 mesh with each other in such a way as to be rotatable on the axle 44 via two shaft bearings 145, 147. Advantageous examples of shaft bearings 145, 147, which are shown only in very abstract form, are plain bearings or needle bearings. The shaft bearings 145, 147 have different diameters. The shaft bearings 145, 147 run in grooves on the first, inner stepped shaft 169, in particular the journal region 162 thereof, and are supported against the second stub shaft 171, in particular in the journal receptacle region 164 thereof, said second stub shaft coaxially surrounding the first stub shaft 169 in the journal region 162 of the latter. Between the journal region 162 and the journal receptacle region 164, an air gap 83$^{II}$ is provided next to the shaft bearings 145, 147 and between the shaft bearings 145, 147.

The stepped shaft 169 can therefore be regarded as a shaft that is stepped differently in two directions, said shaft having the largest diameter and carrying the gear 75$^{II}$. Starting from the largest diameter below or next to the gear 75$^{III}$, the second stepped shaft 171 is a shaft that tapers in a stepped manner, which runs out into the splined shaft profile 107 as the smallest diameter of the stepped shaft 171.

The second stepped shaft 171 is a shaft that is hollow in part. The first stepped shaft 169 is a shaft that is solid throughout. At the point where the drive torque is introduced into the second stepped shaft 171, namely on the second shaft casing 111, the stepped shaft 171 is likewise a solid stepped shaft. Only in the region of the shaft bearings 145, 147 or in the gear rim 58$^I$ with the gear 75$^{III}$ is the stepped shaft 171 hollow in some steps. The journal region 162 of the other stepped shaft 169 is received in the cavity, as a result of which the journal region extends away from the gear 75$^{II}$ and below the gear 75$^{III}$ of the partially hollow stepped shaft 171.

The narrower shaft bearing 147, which can also be referred to as the shaft bearing that has a smaller diameter, is located in the interior of the bearing pair 175. The smaller shaft bearing 147 is located in an aligned manner between the bearings 179, 183 of the second bearing pair 175. The other shaft bearing 145 is located below the gear 75$^{III}$. In other words, the second shaft bearing 147 lies opposite the bearing pair 175 in a plane perpendicular to the axis of the input shafts 44. The first shaft bearing 145 is assigned to the gear cheeks 101, 103.

The two stepped shafts 169, 171 are connected to each other via shaft bearings 145, 147. Each stepped shaft 169, 171 is supported against a case part by a combination of a deep groove ball bearing 177, 179 and a cylindrical roller bearing 181, 183.

As suitable shaft bearings 145, 147, consideration is particularly preferably given to plain bearings and needle bearings. Depending on the application, a plain bearing or a needle bearing is installed either at one point or at another point.

Owing to the solid design of the stub shafts 161, 163 and the extremely short design thanks to the piloted dual input shaft 32$^I$, rapidly rotating electric machines 5, 7 or 5$^{II}$, 7$^{II}$ that drive at high torque (see FIG. 1 or FIG. 2) can be connected to the input side of the transmission 1.

It is sufficient if the stepped shafts 169, 171 are designed as stub shafts 161, 163. For instance, it is possible to use stepped shafts 169, 171 having a length that is less than ten times the width at the gear rim 58$^I$.

The design possibilities shown in the individual figures can also be combined with each other in any form.

For instance, it is possible to make the partition walls 73, 73$^I$ longer or shorter and yet still leave a total, contiguous oil space in the transmission case 31.

At the location where a breather cap 130 is provided, a breather element 130$^I$ can of course also be used instead of the cap, for example in order to improve a flow distribution.

A twin transmission, which is designed in a similar way to the transmissions 1, 1$^I$, 1$^{II}$, 1$^{III}$, may be equipped with one, two or more than two vents of the types described above. In other words, various stationary axles are available, on each of which a vent can be arranged. Choosing which of the axles to use for one, two or more than two vents is a design task for a transmission designer.

In addition, a person skilled in the art understands that the rear-axle drive variant of a motor vehicle 500 or 500$^I$, which is shown by way of example in FIG. 1 or FIG. 2, can also be accordingly reconfigured for a front-axle drive variant of a vehicle with front-axle drive. In this case, not only does the steering movement from the steering wheel 514 act, by way of the steering linkage 516, on the road wheels 510, 512 and the angle position thereof, but also the powertrain 3 opens into the road wheels 510, 512.

The transmission can also be briefly summarized as follows. A dual transmission 1 for a powertrain 3 of a motor vehicle 500 comprising two electric machines 5, 7 is equipped with two single transmissions 15, 17. The single transmissions 15, 17 are two-stage spur gear transmissions with three positions 19, 21, 23 for gear centers 25, 27, 29. Two positions are occupied by input shafts 35 and by output shafts 39 and establish a reference plane B. The position 21 for a middle axle 45 as one of the gear centers 27 forms a corner of a triangle 47 that rests with its longest side on the reference plane B. A straight line g can be drawn from one of the other gear centers 25, 29 to the middle axle 45, thereby forming an angle α in an angle range between 5° and 70°. As a result, a power and/or a torque is transmitted by means of the transmission 1 between one of the input shafts 35 and one of the output shafts 39 via a spur gear intermediate bearing 61, 63 by means of a meshing of teeth. As a result, any introduced transverse forces can be at least partially compensated by diverting transverse forces with the idler wheel of the middle axle 45.

LIST OF REFERENCE SIGNS

Reference Sign Meaning
1, 1$^I$, 1$^{II}$, 1$^{III}$ dual transmission or twin transmission, in particular reduction transmission embodied in duplicate
3, 3$^I$ powertrain, in particular duo electric machine powertrain
5, 5$^{II}$ first electric machine
5$^I$ first drive torque
7, 7$^{II}$ second electric machine
7$^I$ second drive torque
9 energy store, in particular electrical accumulator
11 first electrical lead
13 second electrical lead
15 single transmission, in particular first single transmission or sub-transmission
17 single transmission, in particular second single transmission or sub-transmission
19 position, first
21 position, second, middle
23 position, third
25 gear center, in particular first gear center
27 gear center, in particular second gear center
29 gear center, in particular third gear center
31, 31$^I$ transmission case
32, 32$^I$ dual input shaft
33 input shaft
35 input shaft
37 output shaft
39 output shaft
41 case wall
43 case wall
44 axle, in particular of the input shafts
45 axle, middle
47 triangle
49, 49$^I$ gear
50, 50$^I$ gear
51 case bottom
53 stage, first
55 stage, second
57, 57$^I$ tooth
58, 58$^I$, 58$^{II}$ gear rim
59, 59$^I$ tooth
61, 61$^I$ needle bearing
63, 63$^I$ needle bearing
65 rolling bearing
67 rolling bearing
69 rolling bearing
71 rolling bearing
73, 73$^I$ case wall, in particular case partition wall, such as a spectacles-type bearing bracket
75, 75$^I$, 75$^{II}$, 75$^{III}$ gear, in particular of the input shaft
77, 77$^I$, 77$^{II}$ gear, in particular of the output shaft
79, 79$^I$ stepped gear
81, 81$^I$ ball bearing
83, 83$^I$, 83$^{II}$ air gap
85 first direction of rotation, such as direction of rotation at the first position, in particular direction of rotation of input shaft
87 second direction of rotation, such as direction of rotation at the second position, in particular direction of rotation of stepped gear
89 third direction of rotation, such as direction of rotation at the third position, in particular direction of rotation of output shaft
91 sealing surface, in particular sub-case connection surface
93 bolt thread
95 sub-case, in particular first case shell
97 sub-transmission chamber
101 first gear cheek
102 inner side, first inner side
103 second gear cheek
104 inner side, second inner side
105 first splined shaft profile
106, 106$^I$ width
107 second splined shaft profile
108, 108$^I$ internal volume
109 first shaft casing
110 center, in particular of the case, or central region of the case
110$^I$ center, in particular center of a bearing opening in a spectacles-type bearing bracket
110$^{II}$ center, in particular center of a shaft, such as a hollow sleeve, in the case
111 second shaft casing
112 axis, in particular stationary axis extending transversely to an axis of rotation
113 first shaft end face
114 gear axle, in particular stationary hollow gear axle 115 second shaft end face
116, 116$^I$, 116$^{II}$ sleeve
117 first drive connection
118, 118$^I$, 118$^{II}$, bore
118$^{III}$, 118$^{IV}$
119 second drive connection
124, 124$^I$ vent channel
126 cross-section, in particular diameter
128 vent feed line
130, 130$^I$ breather cap or breather element
131 nozzle
132 breather tube
134 first portion, in particular thicker portion
136 second portion, in particular narrower portion
138 transition region
140 transverse bore, in particular first transverse bore
142 transverse bore, in particular second transverse bore
144, 144$^I$ bearing, in particular first floating bearing
145 first shaft bearing
146, 146$^I$ bearing, in particular second floating bearing
147 second shaft bearing
148 idler wheel
150, 150$^I$, 150$^{II}$ spur gear ratio stage
152 lubrication passage
154 central hole structure
155 spectacles-type bearing bracket support structure
156 air space
157 sub-case connection surface
158 spectacles-type bearing bracket attachment
159 spectacles-type bearing bracket fork
161 first stub shaft
162 journal region, in particular journal of the first stub shaft
163 second stub shaft
164 journal receptacle, in particular of the second stub shaft
165 first stub
167 second stub
169 first stepped shaft
171 second stepped shaft
173 first bearing, in particular bearing pair
175 second bearing, in particular bearing pair
177 first ball bearing, in particular deep groove ball bearing
179 second ball bearing, in particular deep groove ball bearing
181 first cylindrical roller bearing
183 second cylindrical roller bearing
190 case longitudinal direction
500, 500$^I$ motor vehicle
502 direction of travel
504 vehicle floor
506 first road wheel
508 second road wheel
510 third road wheel
512 fourth road wheel
514 steering wheel
516 steering linkage
518, 518$^I$ vehicle rear axle
520 first half-axle
522 second half-axle
524 vehicle longitudinal axis
526 rear compartment
528 trunk region
532 coupling
534 coupling M region, in particular middle region
B reference plane
g straight line
$d_1$ diameter of a gear 75, 75$^I$ of the input shaft
$d_2$ diameter of a gear of the stepped gear 49, 49$^I$
$d_3$ diameter of a gear of the stepped gear 50, 50$^I$
$d_4$ diameter of a gear 77, 77$^I$ of the output shaft
$\beta_1$ angle of inclination
$\beta_2$ angle of inclination
$\alpha$ angle, in particular deviation from the reference plane B

The invention claimed is:

1. A dual transmission comprising input shafts, output shafts, a transmission case and two separate single transmissions arranged in the transmission case,
   wherein the dual transmission is configured for being arranged in a powertrain of a motor vehicle with at least two electric machines for propulsion by being configured to be driven by the two electric machines via the input shafts and by being configured to drive one separate wheel of the motor vehicle by each output shaft, each single transmission providing a speed reduction,
   wherein each single transmission is a two-stage spur gear transmission with three positions for gear centers, a first position of the three positions being occupied by one of the input shafts and a second position of the three positions being occupied by one of the output shafts,
   wherein the input shafts and the output shafts are arranged in a middle region of the dual transmission and extend transversely to a case longitudinal direction of the transmission case,
   wherein an arrangement of the input shafts and output shafts defines a reference plane within the transmission case,
   wherein a third position of the three positions is for a middle stationary axle fixed to the transmission case and configured to stiffen the transmission case, the middle stationary axle being arranged in angular alignment to the reference plane,
   wherein the first, second and third position are each at a distance from a transmission case bottom, the distance of the third position being greater than the distance of the first position and the second position,
   wherein the first, second and third position define a triangular arrangement having a first side defined by a distance between the first position and the second position, a second side defined by a distance between the first position and the third position, and a third side defined by a distance between the second position and the third position,
   wherein the first side is a longest side of the triangular arrangement and rests on the reference plane, and the second side and the third side form respective angles with the first side and thus with the reference plane, at least one of said angles being selected from a range between 5° and 70°.

2. The dual transmission according to claim 1, wherein upon gear contact, rotation of a driven gear, configured to rotate about the middle stationary axle, occurs in a direction of rotation away from the transmission case bottom of the transmission case in a driving manner following gear contact.

3. The dual transmission according to claim 1, wherein the input shafts and the output shafts are each rotatably arranged in pairs in an aligned manner, at a distance from the transmission case bottom that is lower than a distance of the middle axle from the transmission case bottom.

4. The dual transmission according to claim 1, further comprising stepped gears rotatably mounted on the middle axle.

5. The dual transmission according to claim 1, configured to implement
   a first speed reduction ratio in a first stage of the two-stage spur gear transmission in a direction away from the transmission case bottom and
   a second speed reduction ratio in a second stage of the two-stage spur gear transmission in a direction toward the transmission case bottom.

6. The dual transmission according to claim 1, wherein gears mounted on the middle axle are supported by bearings configured to transmit a torque free of transverse forces.

7. The dual transmission according to claim 6, wherein teeth of two adjacent toothings of the gears on the middle axle are formed with a different respective angle of inclination, each gear being a member of a helical gear set.

8. The dual transmission according to claim 1, further comprising a vent channel for venting air from an interior of the dual transmission, the vent channel being arranged i) in a stationary axle of the dual transmission or ii) perpendicular to a gear axle.

9. The dual transmission according to claim 1, wherein the middle axle forms a support for at least two idler wheels.

10. The dual transmission according to claim 8, wherein the vent channel is mounted within a region of the transmission case, said region, in an installed position of the dual transmission, remaining above a maximum level of oil in case tilt angles of the dual transmission are less than 45°.

11. The dual transmission according to claim 1, wherein the input shafts are drive shafts partially nested one inside the other, each input shaft extending towards a connection provided for one of the electric machines, each input shaft having a cantilever end.

12. The dual transmission according to claim 1, wherein the input shafts are embodied as one common dual shaft, which is a coaxial shaft arrangement, the dual shaft being supported at four points within the transmission case of the dual transmission.

13. The dual transmission according to claim 1, wherein the dual transmission comprises first gears arranged directly adjacent to each other with an air gap between respective gear cheeks, each of the first gears being configured to mesh with a gear on one of the input shafts or a gear on one of the output shafts, to form a pair providing a respective speed reduction ratio, wherein each pair comprising one of the first gears is supported for rotation independent of each pair comprising the other first gear.

14. The dual transmission according to claim 1, the dual transmission further comprising a single bearing bracket, wherein the output shafts are supported at their ends by the single bearing bracket, the bearing bracket having a central hole structure for receiving each said end.

15. The dual transmission according to claim 1, wherein the input shafts and the output shafts extend over a shorter range of a distance from one case wall to an opposite case wall of the transmission case.

16. The dual transmission according to claim 4, wherein the stepped gears have a larger, first diameter on a motor drive side and a smaller, second diameter on an output side of the third position.

17. The dual transmission according to claim 6, wherein the gears mounted on the middle axle comprise
   a first gear with a first diameter and a first inclination angle, and a second gear with a second diameter and a second inclination angle, and
   wherein the first diameter is larger than the second diameter, and the first inclination angle is larger than the second inclination angle.

18. The dual transmission according to claim 8, wherein the vent channel comprises a sleeve including at least one bore provided in the third position, the sleeve enclosing a cylindrical space passing through the transmission case from a first inner side to either an opposite, second inner side or to a center in the transmission case.

19. A twin transmission for a duo electric machine powertrain with single-wheel drive, to be driven by two electric machines, each for driving a respective road wheel of a motor vehicle, the twin transmission comprising:
   a first sub-transmission and a second sub-transmission;
   one single middle stationary axle;
   an input shaft configured for connection to each of the two electric machines, through which input shaft one of the first and second sub-transmission of the twin transmission is driven as a result of a drive power of said one of the two electric machines;
   a spur gear intermediate bearing, on which at least one gear is located and supported;
   the single middle stationary axle being configured for support of the spur gear intermediate bearing, the single middle stationary axle being fixed to a transmission case and being configured to stiffen the transmission case; and
   an output shaft configured for being connected with a wheel half-axle,
   wherein:
      the input shaft and the output shaft are arranged for torque transfer by rotation through a tooth meshing of gears having a first gear center for the input shaft, a second gear center for the single middle stationary axle and a third gear center for the output shaft,
      a transmission train from the input shaft, via the spur gear intermediate bearing, to the output shaft is configured with the first gear center, the second gear center, and the third gear center following a shape of an upside down letter V,
      the input shaft and the output shaft are located on an uniform, geometrically defined plane, which is spanned by the third gear center and by an axis of the input shaft through the first gear center, wherein the plane is configured for being arranged parallel to a plane spanned by four road wheel carriers of the motor vehicle,
      the spur gear intermediate bearing is a deflection stage for a torque, and
      the spur gear intermediate bearing has at least one freewheel body and at least one gear that is mounted as an idler wheel, so that introduced transverse forces are at least partially compensated by diverting transverse forces on the idler wheel with respect to the single middle stationary axle.

20. A dual transmission for a powertrain of a motor vehicle, comprising
   two input shafts being configured to be driven by two electric machines of the motor vehicle, and
   two separate single transmissions, each single transmission configured for being connected with a separate wheel of the motor vehicle and to provide a respective speed reduction,
   wherein each single transmission is a two-stage spur gear transmission with three positions for gear centers in a common transmission case, a first position of the three positions being occupied by an input shaft of the two input shafts and a second position of the three positions being occupied by an output gear, wherein an input shaft center and an output gear center are arranged in a middle region of the dual transmission and the input shaft of each single transmission extends transversely to a case longitudinal direction of the transmission case, wherein an arrangement of the input shaft center and the output gear center defines a horizontal reference plane within the transmission case at a first distance from a transmission case bottom, when the dual transmission is in a mounting orientation corresponding to a mounted position of the dual transmission in the motor vehicle, wherein a third position of the three positions is for a center of a middle stationary axle, the middle stationary axle being fixed to the transmission case and configured to stiffen the transmission case, the middle stationary axle being arranged parallel to the horizontal reference plane at a second distance from the transmission case bottom greater than the first distance, wherein the first position, the second position and the third position define connecting lines between the third position and the first position and between the third position and the second position, said lines forming respective angles with the horizontal reference plane, each said respective angle being selected from a range between 10° and 50°.

* * * * *